United States Patent
Dougherty et al.

(10) Patent No.: US 10,573,008 B2
(45) Date of Patent: Feb. 25, 2020

(54) APPARATUSES AND METHODS FOR NAVIGATION IN AND LOCAL SEGMENTATION EXTENSION OF ANATOMICAL TREELIKE STRUCTURES

(71) Applicant: Veran Medical Technologies, Inc., St. Louis, MO (US)

(72) Inventors: Andrew Dougherty, Denver, CO (US); Mark Hunter, St. Louis, MO (US)

(73) Assignee: Veran Medical Technologies, Inc, St. Louis, MO (US)

( * ) Notice: Subject to any disclaimer, the term of this patent is extended or adjusted under 35 U.S.C. 154(b) by 89 days.

(21) Appl. No.: 15/953,150

(22) Filed: Apr. 13, 2018

(65) Prior Publication Data
US 2019/0318484 A1    Oct. 17, 2019

Related U.S. Application Data

(63) Continuation of application No. 15/952,189, filed on Apr. 12, 2018.

(51) Int. Cl.
| | |
|---|---|
| *G06T 7/00* | (2017.01) |
| *G06T 7/60* | (2017.01) |
| *G06T 7/187* | (2017.01) |
| *G06T 7/64* | (2017.01) |
| *G06T 7/62* | (2017.01) |

(Continued)

(52) U.S. Cl.
CPC .............. *G06T 7/187* (2017.01); *G06T 7/11* (2017.01); *G06T 7/215* (2017.01); *G06T 7/62* (2017.01); *G06T 7/64* (2017.01); *G06T 7/73* (2017.01); *G06T 15/08* (2013.01); *G06T 2207/10028* (2013.01); *G06T 2207/10132* (2013.01); *G06T 2207/30064* (2013.01); *G06T 2207/30204* (2013.01); *G06T 2207/30241* (2013.01); *G06T 2210/41* (2013.01)

(58) Field of Classification Search
CPC ........... G06T 7/187; G06T 7/64; G06T 7/215; G06T 7/62; G06T 7/11; G06T 7/73; G06T 15/08
See application file for complete search history.

(56) References Cited

U.S. PATENT DOCUMENTS

| | | | |
|---|---|---|---|
| 8,705,817 B2 * | 4/2014 | Saint Felix .......... | A61B 5/4504 382/128 |
| 2005/0182295 A1 * | 8/2005 | Soper .................. | A61B 1/0008 600/117 |

(Continued)

OTHER PUBLICATIONS

Jul. 9, 2019 PCT Search Report (Serial No. PCT/US19/26244).

*Primary Examiner* — David F Dunphy
(74) *Attorney, Agent, or Firm* — Tysver Beck Evans

(57) ABSTRACT

A method of extending a segmentation of an image using navigated image data from a navigation system includes tracking, with the navigation system, at least one of a traveled path and a position of an imaging device relative to an initial segmentation of 3D image data including an initial treelike structure. Navigated image data including image data including at least one 2D or 3D image is captured with the imaging device. A point from the navigated image data corresponding to a potential airway structure is obtained by the navigation system. The initial segmentation of 3D image data is extended by the navigation system using the point obtained from the navigated image data.

20 Claims, 21 Drawing Sheets

(51) Int. Cl.
*G06T 15/08* (2011.01)
*G06T 7/11* (2017.01)
*G06T 7/73* (2017.01)
*G06T 7/215* (2017.01)

(56) References Cited

U.S. PATENT DOCUMENTS

| | | |
|---|---|---|
| 2007/0127800 A1 | 6/2007 | Coenen et al. |
| 2007/0165917 A1 | 7/2007 | Cao et al. |
| 2008/0192887 A1 | 8/2008 | Weese et al. |
| 2010/0265251 A1* | 10/2010 | Vining ................ G06T 7/11 345/420 |
| 2013/0223702 A1* | 8/2013 | Holsing ............... A61B 5/061 382/128 |
| 2013/0321583 A1* | 12/2013 | Hager ................ G06T 7/0012 348/46 |
| 2014/0210821 A1 | 7/2014 | Kapoor et al. |
| 2015/0320514 A1* | 11/2015 | Ahn .................... A61B 34/30 606/130 |
| 2017/0084027 A1* | 3/2017 | Mintz .................. A61B 5/061 |
| 2017/0228868 A1 | 8/2017 | Song et al. |
| 2019/0110839 A1* | 4/2019 | Rafii-Tari ............ A61B 34/10 |

* cited by examiner

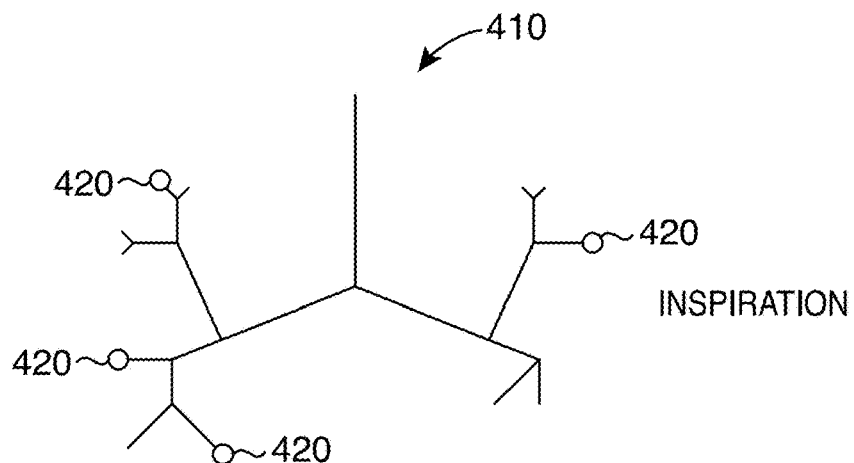
FIG 6A — INSPIRATION
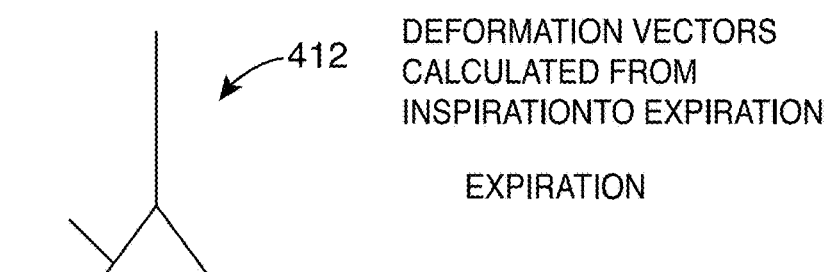
FIG 6B — EXPIRATION
DEFORMATION VECTORS CALCULATED FROM INSPIRATION TO EXPIRATION
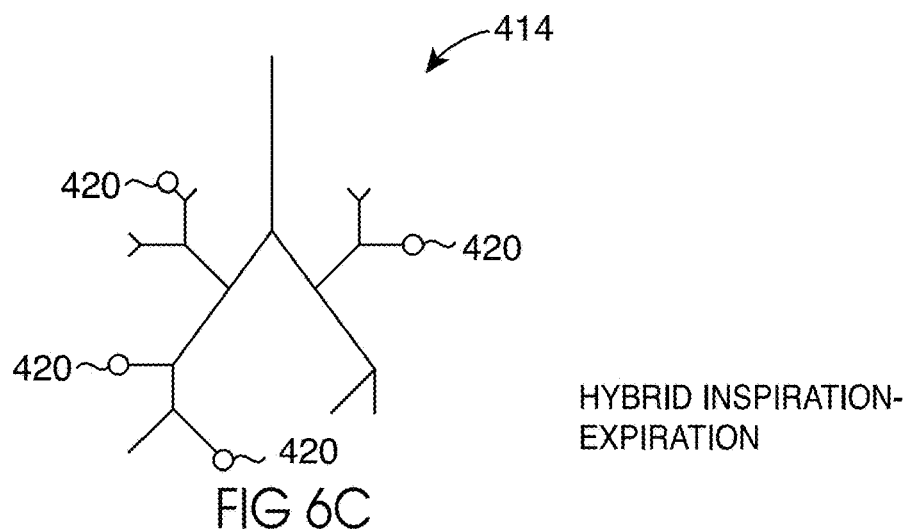
FIG 6C — HYBRID INSPIRATION-EXPIRATION

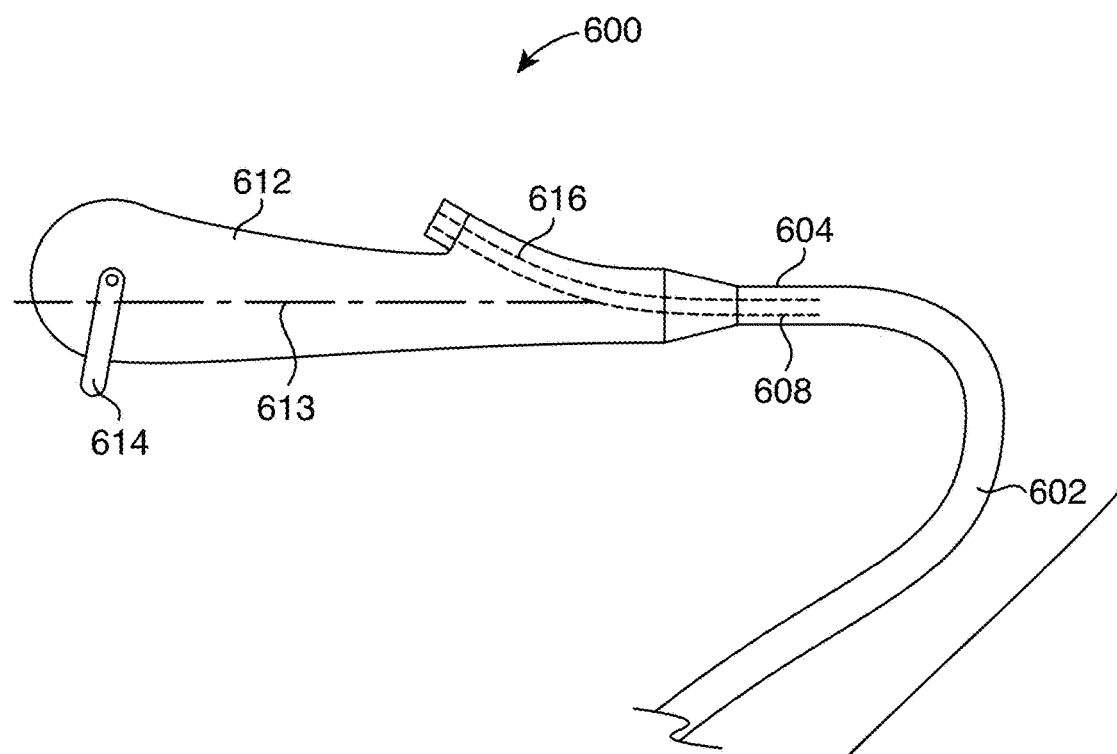
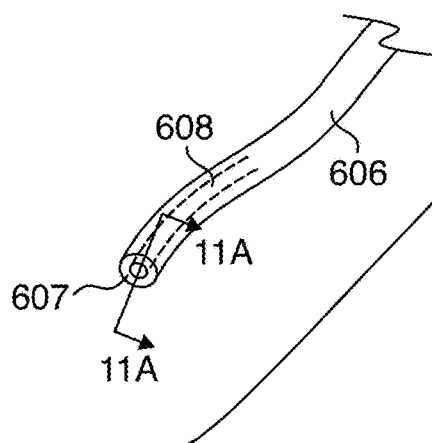
FIG. 11
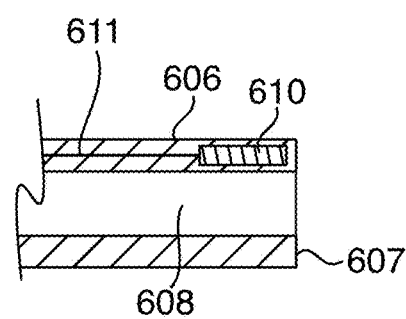
FIG. 11A

… … …
APPARATUSES AND METHODS FOR NAVIGATION IN AND LOCAL SEGMENTATION EXTENSION OF ANATOMICAL TREELIKE STRUCTURES

CROSS-REFERENCE TO RELATED APPLICATION

This application is a continuation of U.S. Ser. No. 15/952,189, filed Apr. 12, 2018, the entirety of which is incorporated herein by reference.

FIELD

The present disclosure relates generally to medical devices, and particularly to apparatuses and methods associated with a range of image-guided medical procedures for detecting, sampling, staging, and/or treating target tissues, including medical imaging and image processing methods used therefore.

BACKGROUND

Image-guided surgery, also known as image-guided intervention, enhances a physician's ability to locate instruments within anatomy during a medical procedure. Image-guided surgery can include 2-dimensional (2D), 3-dimensional (3D), and 4-dimensional (4D) applications. The fourth dimension of image-guided surgery can include multiple parameters either individually or together such as time, motion, electrical signals, pressure, airflow, blood flow, respiration, heartbeat, and other patient measured parameters.

Practitioners often use 3D medical imaging (e.g., CT, MRI) methods to assess a patient's anatomy and for use during treatment (e.g., during image-guided surgery). In order to access a target area (such as a node, nodule, tumor, or other target), the practitioner must navigate through the patient's anatomy to the target area. As disclosed and described in U.S. Ser. Nos. 13/817,730 and 15/290,822, the entireties of which are incorporated herein by reference, the medical images are segmented (e.g., to locate boundaries and objects within the images) to provide non-invasive information for use during a procedure, including but not limited to navigating to the target area, determining the best anatomical path to reach the target area, and localizing the medical instrument within the anatomy.

Although significant improvements have been made in these fields, a need remains for improved medical devices and procedures, including improved segmentation and image processing, for visualizing, accessing, locating, real-time confirming, sampling, and manipulating a target tissue or area.

SUMMARY

One aspect of the disclosure is directed to a method of extending a segmentation of an image using navigated image data from a navigation system. The method includes tracking, with the navigation system, at least one of a traveled path and a position of an imaging device relative to an initial segmentation of 3D image data including an initial treelike structure. Navigated image data comprising image data including at least one 2D or 3D image is captured with the imaging device. A point from the navigated image data corresponding to a potential airway structure is obtained by the navigation system. The initial segmentation of 3D image data is extended by the navigation system using the point obtained from the navigated image data.

Another aspect of the disclosure is directed to a method of extending a segmentation of an image using navigation data from a navigation system. The method includes tracking, with the navigation system, at least one of a traveled path, a position, and a trajectory of a navigated instrument relative to an initial segmentation of 3D image data including an initial treelike structure to create navigation data. The initial segmentation of the 3D image data is extended using the navigation data. Extending the initial segmentation includes extracting a region of interest from the 3D image data to create a sub-image and extracting connected components based on spillage-constrained region growing using seed points from the sub-image. The extracted components are pruned to discard components not likely to be connected to the initial treelike structure and keep only candidate components likely to be a valid sub-tree of the initial treelike structure. The candidate components are connected to the initial treelike structure to extend the initial segmentation.

Other objects and features will be in part apparent and in part pointed out hereinafter.

BRIEF DESCRIPTION OF THE DRAWINGS

FIG. 6A is a schematic illustration of an inspiration 3D airway model according to an embodiment of the invention;

FIG. 6B is a schematic illustration of an expiration 3D airway model according to an embodiment of the invention;

FIG. 6C is a schematic illustration of a hybrid "Inspiration-Expiration" 3D airway model according to an embodiment of the invention;

FIG. 11 is a left side view of a steerable catheter according to an embodiment of the invention;

FIG. 11A is a left partial section view of a steerable catheter according to an embodiment of the invention;

Like reference numerals indicate corresponding parts throughout the several views of the drawings.

DETAILED DESCRIPTION

Figure 1:
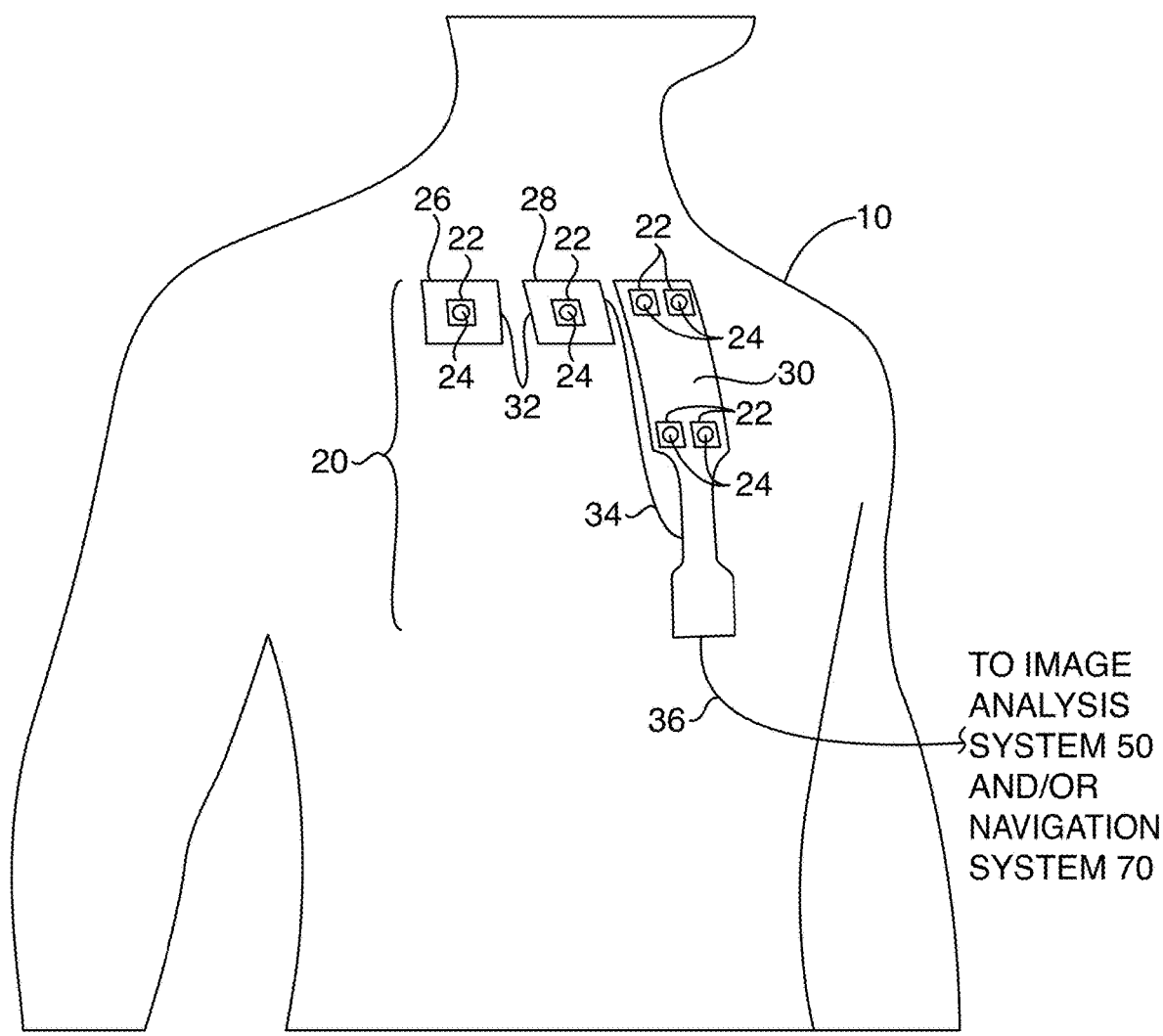
FIG. 1 is a left perspective view of a patient tracking device on a patient according to an embodiment of the invention.

The accompanying Figures and this description depict and describe embodiments of a navigation system (and related methods and devices) in accordance with the present invention, and features and components thereof. It should also be noted that any references herein to front and back, right and left, top and bottom and upper and lower are intended for convenience of description, not to limit the present invention or its components to any one positional or spatial orientation.

Those of skill in the art will appreciate that in the detailed description below, certain well known components and assembly techniques have been omitted so that the present methods, apparatuses, and systems are not obscured in unnecessary detail.

Embodiments of the present disclosure are directed to extending branches of segmented anatomical treelike structures in 3D image data. As used herein, the term 3D image data refers to any type of 3-dimensional imaging modalities, including but not limited to computed tomography, fused computed tomography/positron emission tomography, magnetic resonance imaging, positron emission tomography, single photon emission computed tomography, 3D ultrasound, 3D fluoroscopy, or any other 3D imaging modality.

With larger volumes of patients expected to obtain lung cancer screening, obtaining definitive diagnoses may avoid numerous unneeded lung resections as about only 4% of patients from lung cancer screening are typically found to have a malignancy. However, peripheral target tissues (e.g., nodule, lesion, lymph node, tumor, etc.) that are smaller than 2 cm in size still present a difficult problem to solve. Typical bronchoscopes that are designed mainly for central airway inspection will be limited to the extent they can travel due to their large diameters before becoming wedged in the airway of the patient. Thus, to affect the 5 and 10 year survival rate of patient's that have target tissues which may be less than 2 cm in size, the apparatuses and methods as described herein allow for enhanced target tissue analysis for staging, intercepting target tissues in the periphery of the lungs that may not be accessible via airways, obtaining larger and higher quality tissue samples for testing, and provide a streamlined patient flow. Accordingly, the apparatuses and methods described herein enable a physician or other healthcare professional to initially determine the location of a target tissue and to confirm the location of the target tissue. In one embodiment, a hybrid "Inspiration-Expiration" 3D model may be used to provide patient specific 4D respiratory models which address peripheral respiratory motion. In certain patients, portions of the lungs including the upper lobes may move, on average, 15 mm between inspiration and expiration. Using a steerable catheter with an imaging device, such as a radial endobronchial ultrasound (EBUS) device inserted therein, a physician or other healthcare professional can determine a confirmed location of the target tissue. Additionally, apparatuses and methods described herein enable a physician or other healthcare professional to transition to a percutaneous approach to the target tissue, if needed, or to access the target tissue endobronchially if possible. If the physician or other healthcare professional is unable to reach the target tissue for any reason, including but not limited to, the target tissue being below the surface of the airway (i.e., sub-surface target tissue), no airway proximate the target tissue, the pathway to the target tissue is very tortuous, or larger or additional tissue sample from a core biopsy is desired, the physician or other healthcare professional may insert navigated percutaneous needles to the confirmed location of the target tissue. Thus it will be understood that the apparatuses and methods described herein may be used to intercept target tissue(s) in the airway, on the wall of the airway, in the wall of the airway, and/or beyond the wall of the airway. That is, the apparatuses and methods described herein may be used to intercept target tissue(s) not only inside the airway, but may intercept target tissue(s) and other anatomical structures inside and/or beyond the wall of the airway. Thus in certain embodiments, sub-surface target tissue(s) may be intercepted.

As shown in FIG. 1, an apparatus according to an embodiment of the invention includes patient tracking device (PTD) 20 comprising two or more markers 22 and two or more localization elements 24 proximate markers 22. Markers 22 are visible in images captured by an imaging device and the position and orientation (POSE) of localization elements 24 may be tracked by a localization device in an image analysis system and/or a navigation system. PTD 20 comprises a population of separate pads 26, 28, 30, each of which may include one or more markers 22 and localization elements 24 proximate markers 22. First and second pads 26, 28 may each include one marker 22 and one localization element 24. Third pad 30 may include four markers 22 and four localization elements 24 located proximate the periphery of third pad 30. Additionally, wires 32, 34, 36 are used to connect localization elements 24 in each of first, second, and third pads 26, 28, 30 to image analysis system 50 (see FIG. 2) and/or navigation system 70 (see FIG. 3). In alternative embodiments, localization elements 24 may be wirelessly connected to navigation system 70. FIG. 1 illustrates PTD 20 having six markers 22 and six localization elements 24, but any number of two or more markers 22 and localization elements 24 can be used. Patient tracking device (PTD) 20 can be coupled to a dynamic body such as, for example, a selected dynamic portion of the anatomy of a patient 10.

Markers 22 are constructed of a material that can be viewed on an image, such as, for example, X-ray images or CT images. In certain embodiments, markers 22 can be, for example, radiopaque such that they are visible via fluoroscopic imaging. In other embodiments, for example, markers 22 may be echogenic such that they are visible via ultrasonic imaging. In yet other embodiments, markers 22 may be both radiopaque and echogenic. In certain embodiments, for example, localization elements 24 comprise six (6) degree of freedom (6 DOF) electromagnetic coil sensors. In other embodiments, localization elements 24 comprise five (5) degree of freedom (5 DOF) electromagnetic coil sensors. In other embodiments, localization elements 24 comprise other localization devices such as radiopaque markers that are visible via fluoroscopic imaging and echogenic patterns that are visible via ultrasonic imaging. In yet other embodiments, localization elements 24 can be, for example, infrared light emitting diodes, and/or optical passive reflective markers. Localization elements 24 can also be, or be integrated with, one or more fiber optic localization (FDL) devices.

While PTD 20 is shown comprising a population of separate pads containing markers 22 and localization elements 24, in certain embodiments, PTD 20 may comprise one pad containing markers 22 and localization elements 24. In another embodiment, for example, PTD 20 may include markers 22 but not localization elements 24. In another embodiment, for example, PTD 20 may include localization elements 24 but not markers 22. In various embodiments, markers 22 and localization elements 24 can be the same device. In certain embodiments, for example, localization elements 24 may function or serve as markers 22. PTD 20 can be a variety of different shapes and sizes. For example, in one embodiment PTD 20 is substantially planar, such as in the form of a pad that can be disposed at a variety of locations on a patient's 10 body. PTD 20 can be coupled to patient 10 with adhesive, straps, hook and pile, snaps, or any other suitable coupling method. In another embodiment the PTD can be a catheter type device with a pigtail or anchoring mechanism that allows it to be attached to an internal organ or along a vessel.

As described more fully elsewhere herein, an image analysis system is configured to receive image data associated with the dynamic body generated during a pre-surgical or pre-procedural first time interval. The image data can include an indication of a position of each of markers 22 for multiple instants in time during the first time interval. Then a navigation system can also receive position data associated with localization elements 24 during a second time interval in which a surgical procedure or other medical procedure is being performed. The navigation system can use the position data received from localization elements 24 to determine a distance between the localization elements 24 for a given instant in time during the second time interval. The navigation system can also use the image data to determine the distance between markers 22 for a given instant in time during the first time interval. The navigation system can then find a match between an image where the distance between markers 22 at a given instant in time during the first time interval is the same or substantially the same as the distance between localization elements 24 associated with those markers 22 at a given instant in time during the medical procedure, or second time interval. Additionally, the navigation system can determine a sequence of motion of the markers and match this sequence of motion to the recorded motion of the markers over the complete procedure or significant period of time. Distance alone between the markers may not be sufficient to match the patient space to image space in many instances, the system may also determine the direction the markers are moving and the range and speed of this motion to find the appropriate sequence of motion for a complex signal or sequence of motion by the patient.

A physician or other healthcare professional can use the images selected by the navigation system during a medical procedure performed during the second time interval. For example, when a medical procedure is performed on a targeted anatomy of a patient, such as a heart or lung, the physician may not be able to utilize an imaging device during the medical procedure to guide him to the targeted area within the patient. Accordingly, PTD 20 can be positioned or coupled to the patient proximate the targeted anatomy prior to the medical procedure, and pre-procedural images can be taken of the targeted area during a first time interval. Markers 22 of PTD 20 can be viewed with the image data, which can include an indication of the position of markers 22 during a given path of motion of the targeted anatomy (e.g., the heart) during the first time interval. Such motion can be due, for example, to inspiration (i.e., inhaling) and expiration (i.e., exhaling) of the patient, or due to the heart beating. During a medical procedure, performed during a second time interval, such as a procedure on a heart or lung, the navigation system receives data from localization elements 24 associated with a position of localization elements 24 at a given instant in time during the medical procedure (or second time interval). The distance between selected pairs of markers 22 can be determined from the image data and the distance, range, acceleration, and speed between corresponding selected pairs of localization elements 24 can be determined based on the position and orientation (POSE) data for given instants in time. Accordingly, the range of motion and speed of markers 22 can be calculated.

Because localization elements 24 are proximate the location of markers 22, the distance between a selected pair of localization elements 24 can be used to determine an intra-procedural distance between the pair of corresponding markers 22. An image from the pre-procedural image data taken during the first time interval can then be selected where the distance between the pair of selected markers 22 in that image corresponds with or closely approximates the same distance determined using localization elements 24 at a given instant in time during the second time interval. This process can be done continuously during the medical procedure, producing simulated real-time, intra-procedural images illustrating the orientation and shape of the targeted anatomy as a catheter, sheath, needle, forceps, guidewire, fiducial delivery devices, therapy device, or similar medical device(s) is/are navigated to the targeted anatomy. Thus, during the medical procedure, the physician can view selected image(s) of the targeted anatomy that correspond to and simulate real-time movement of the anatomy. In addition, during a medical procedure being performed during the second time interval, such as navigating a catheter or other medical device or component thereof to a targeted anatomy, the location(s) of a localization element (e.g., an electromagnetic coil sensor) coupled to the catheter during the second time interval can be superimposed on an image of a catheter. The superimposed image(s) of the catheter can then be superimposed on the selected image(s) from the first time interval, providing simulated real-time images of the catheter location relative to the targeted anatomy. This process and other related methods are described in U.S. Pat. No. 7,398,116, entitled Methods, Apparatuses, and Systems Useful in Conducting Image Guided Interventions, filed Aug. 26, 2003, which is hereby incorporated by reference.

Figure 2:
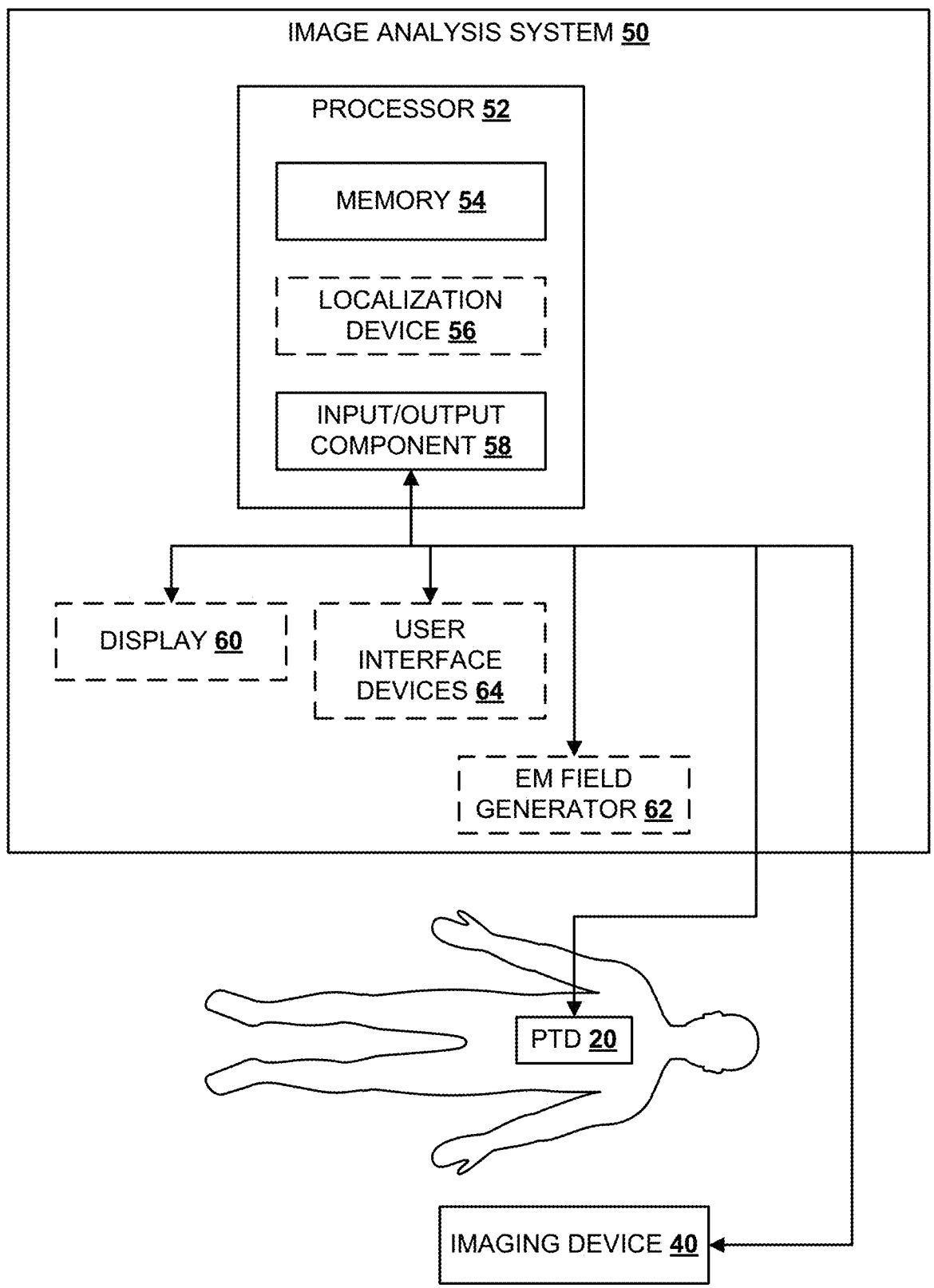
FIG. 2 is a schematic illustration of an image analysis system according to an embodiment of the invention.
Figure 3:
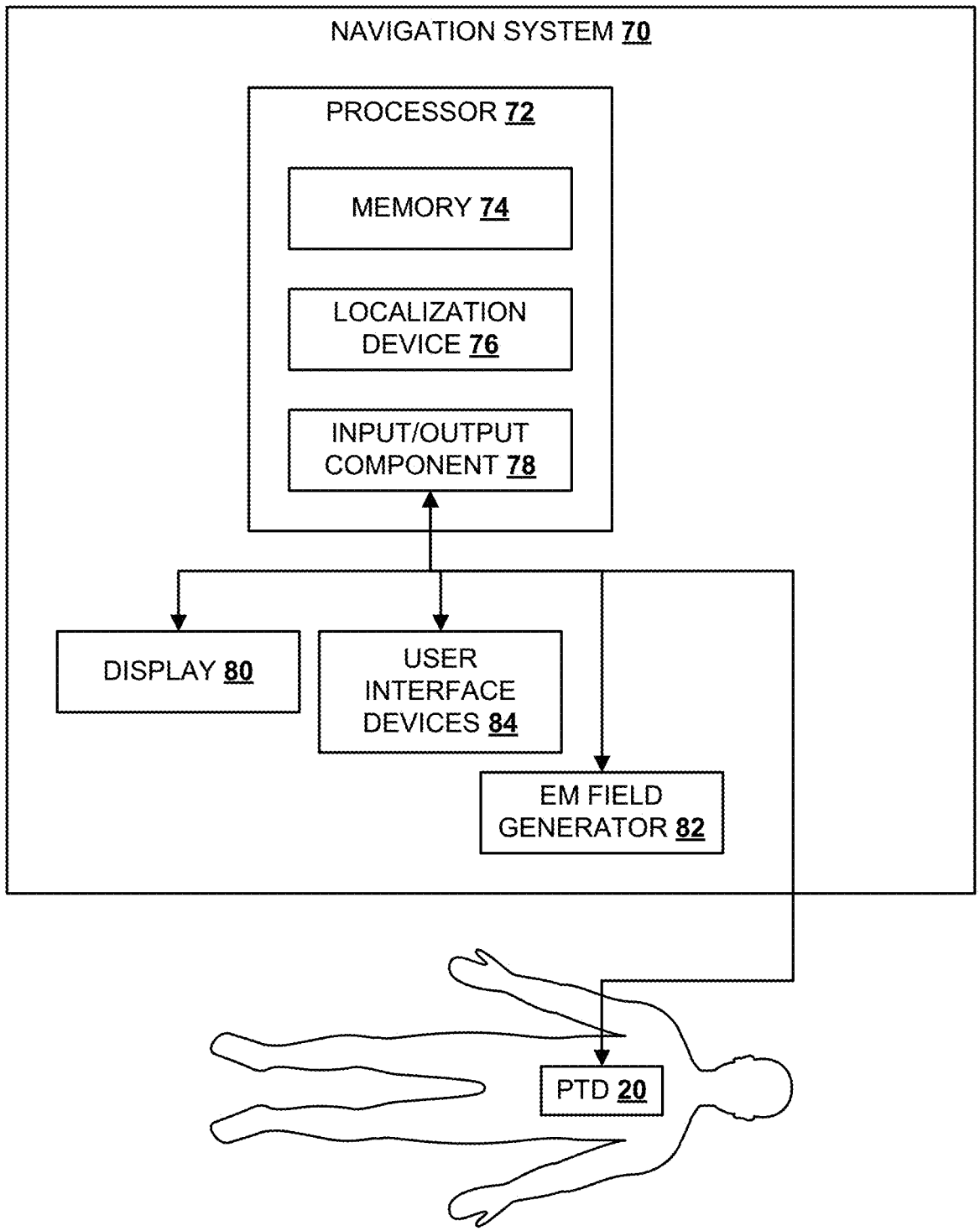
FIG. 3 is a schematic illustration of a navigation system according to an embodiment of the invention.

Referring now to FIGS. 2 and 3, two systems which may be used during image guided surgery are described in detail. The first system illustrated in FIG. 2, is image analysis system 50. Image analysis system 50 is used during generation of a population of images of patient 10 during a first time interval, prior to a medical procedure being performed on patient 10. The second system, illustrated in FIG. 3, is navigation system 70. Navigation system 70 is used during a medical procedure performed on patient 10 during a second time interval. As will be described, imaging system 50 and navigation system 70 may include, in various embodiments, substantially similar or identical components. Accordingly, image analysis system 50 and navigation system 70 may be able to carry out substantially similar or identical functions. In certain embodiments, image analysis system 50 and navigation system 70 and may comprise a single system. In certain embodiments, for example, image analysis system 50 may also function or serve as a navigation system. In certain embodiments, for example, navigation system 70 may also function or serve as an image analysis system.

As shown in FIG. 2, image analysis system 50 comprises a processor 52 having memory component 54, input/output (I/O) component 58, and optional localization device 56. Image analysis system 50 may also optionally include display 60, electromagnetic field generator 62, and/or user interface device(s) 64 (e.g., keyboard, mouse).

Image analysis system 50 further includes and/or is in data communication with imaging device 40. Imaging device 40 can be, for example, a computed tomography (CT) device (e.g., respiratory-gated CT device, ECG-gated CT device), a magnetic resonance imaging (MRI) device (e.g., respiratory-gated MRI device, ECG-gated MRI device), an X-ray device, a 2D or 3D fluoroscopic imaging device, and 2D, 3D or 4D ultrasound imaging devices, or any other suitable medical imaging device. In one embodiment, for example, imaging device 40 is a computed tomography-positron emission tomography (CT/PET) device that produces a fused computed tomography-positron emission tomography (CT/PET) image dataset. In the case of a two-dimensional imaging device, a population of two-dimensional images may be acquired and then assembled into volumetric data (e.g., three-dimensional (3D) image dataset) as is known in the art using a two-dimensional to three-dimensional conversion. Pre-procedurally during a first time interval, imaging device 40 can be used to generate a population of images of patient 10 while PTD 20 is coupled to patient 10; wherein the population of images depict the anatomy of patient 10. The anatomy, may include, but is not limited to, the lungs, heart, liver, kidneys, and/or other organs of patient 10. The population of images can be compiled into an image dataset. As stated above, some or all markers 22 of PTD 20 are visible on the population of images and provide an indication of a position of some or all of markers 22 during the first time interval. The position of markers 22 at given instants in time through a path of motion of patient 10 can be illustrated with the images.

Processor 52 of image analysis system 50 includes a processor-readable medium storing code representing instructions to cause the processor 52 to perform a process. Processor 52 can be, for example, a commercially available personal computer, or a less complex computing or processing device that is dedicated to performing one or more specific tasks. For example, processor 52 can be a terminal dedicated to providing an interactive graphical user interface (GUI) on optional display 60. Processor 52, according to one or more embodiments of the invention, can be a commercially available microprocessor. Alternatively, processor 52 can be an application-specific integrated circuit (ASIC) or a combination of ASICs, which are designed to achieve one or more specific functions, or enable one or more specific devices or applications. In yet another embodiment, processor 52 can be an analog or digital circuit, or a combination of multiple circuits.

Additionally, processor 52 can include memory component 54. Memory component 54 can include one or more types of memory. For example, memory component 54 can include a read only memory (ROM) component and a random access memory (RAM) component. Memory component 54 can also include other types of memory that are suitable for storing data in a form retrievable by processor 52. For example, electronically programmable read only memory (EPROM), erasable electronically programmable read only memory (EEPROM), flash memory, as well as other suitable forms of memory can be included within the memory component. Processor 52 can also include a variety of other components, such as for example, coprocessors, graphic processors, etc., depending upon the desired functionality of the code.

Processor 52 can store data in memory component 54 or retrieve data previously stored in memory component 54. The components of processor 52 can communicate with devices external to processor 52 by way of input/output (I/O) component 58. According to one or more embodiments of the invention, I/O component 58 includes a variety of suitable communication interfaces. For example, I/O component 58 can include, for example, wired connections, such as standard serial ports, parallel ports, universal serial bus (USB) ports, S-video ports, local area network (LAN) ports, small computer system interface (SCSI) ports, and so forth. Additionally, I/O component 58 can include, for example, wireless connections, such as infrared ports, optical ports, Bluetooth® wireless ports, wireless LAN ports, or the like. Embodiments of image analysis system 50 which include display 60, electromagnetic field generator 62, and/or user interface device(s) 64, such components communicate with processor 52 via I/O component 58.

Processor 52 can be connected to a network, which may be any form of interconnecting network including an intranet, such as a local or wide area network, or an extranet, such as the World Wide Web or the Internet. The network can be physically implemented on a wireless or wired network, on leased or dedicated lines, including a virtual private network (VPN).

As stated above, processor 52 receives the population of images from imaging device 40. Processor 52 identifies the position of selected markers 22 within the image data or voxel space using various segmentation techniques, such as Hounsfield unit thresholding, convolution, connected component, or other combinatory image processing and segmentation techniques. Segmentation methods for identifying anatomical structure and for use during navigation are described in detail herein below. Processor 52 determines a distance and direction between the position of any two markers 22 during multiple instants in time during the first time interval, and stores the image data, as well as the position and distance data, within memory component 54. Multiple images can be produced providing a visual image at multiple instants in time through the path of motion of the dynamic body.

As stated above, processor 52 can optionally include a receiving device or localization device 56 for tracking the location of localization elements 24 of PTD 20, as described more fully elsewhere herein. By tracking localization elements 24 associated with PTD 20 when the population of images are generated by imaging device 40, the population of images may be gated. That is, image analysis system 50 determines the respiratory phase at which the population of images were generated and this information may be stored in an image dataset and/or in another data store in memory component 54.

In general, image analysis system 50 may comprise any tracking system typically employed in image guided surgery, including but not limited to, an electromagnetic tracking system. An example of a suitable electromagnetic tracking subsystem is the AURORA electromagnetic tracking system, commercially available from Northern Digital Inc. (Waterloo, Ontario Canada). In one embodiment, image analysis system 50 may include an electromagnetic tracking system, typically comprising an electromagnetic (EM) field generator 62 that emits a series of electromagnetic fields designed to engulf patient 10, and localization elements 24 coupled to PTD 20. In certain embodiments, for example, localization elements 24 are electromagnetic coils that receive an induced voltage from electromagnetic (EM) field generator 62, wherein the induced voltage is monitored and translated by localization device 56 into a coordinate position of localization elements 24. In certain embodiments, localization elements 24 are electrically coupled to twisted pair conductors to provide electromagnetic shielding of the conductors. This shielding prevents voltage induction along the conductors when exposed to the magnetic flux produced by the electromagnetic field generator.

Accordingly, localization device 56 can be, for example, an analog to digital converter that measures voltages induced onto localization elements 24 in the field generated by EM field generator 62; creates a digital voltage reading; and maps that voltage reading to a metric positional measurement based on a characterized volume of voltages to millimeters from electromagnetic field generator 62. Position data associated with localization elements 24 can be transmitted or sent to localization device 56 continuously during imaging of patient 10 during the first time interval. Thus, the position of localization elements 24 can be captured at given instants in time during the first time interval. Because localization elements 24 are proximate markers 22, localization device 56 uses the position data of localization elements 24 to deduce coordinates or positions associated with markers 22 during the first time interval. The distance, range, acceleration, and speed between one or more selected pairs of localization elements 24 (and corresponding markers 22) is then determined and various algorithms are used to analyze and compare the distance between selected elements 24 at given instants in time, to the distances between and orientation among corresponding markers 22 observed in a population of pre-procedural images.

As shown in FIG. 3, navigation system 70 comprises a processor 72 having memory component 74, input/output (I/O) component 78, and localization device 76. Navigation system 70 also includes display 80, electromagnetic field generator 82, and/or user interface device(s) 84 (e.g., keyboard, mouse). In certain embodiments, navigation system 50 further includes and/or is in data communication with imaging device 40 (see FIG. 2).

Processor 72 of navigation system 70 includes a processor-readable medium storing code representing instructions to cause the processor 72 to perform a process. Processor 72 can be, for example, a commercially available personal computer, or a less complex computing or processing device that is dedicated to performing one or more specific tasks. For example, processor 72 can be a terminal dedicated to providing an interactive graphical user interface (GUI) on optional display 80. Processor 72, according to one or more embodiments of the invention, can be a commercially available microprocessor. Alternatively, processor 72 can be an application-specific integrated circuit (ASIC) or a combination of ASICs, which are designed to achieve one or more specific functions, or enable one or more specific devices or applications. In yet another embodiment, processor 72 can be an analog or digital circuit, or a combination of multiple circuits.

Additionally, processor 72 can include memory component 74. Memory component 74 can include one or more types of memory. For example, memory component 74 can include a read only memory (ROM) component and a random access memory (RAM) component. Memory component 74 can also include other types of memory that are suitable for storing data in a form retrievable by processor 72. For example, electronically programmable read only memory (EPROM), erasable electronically programmable read only memory (EEPROM), flash memory, as well as other suitable forms of memory can be included within the memory component. Processor 72 can also include a variety of other components, such as for example, coprocessors, graphic processors, etc., depending upon the desired functionality of the code.

Processor 72 can store data in memory component 74 or retrieve data previously stored in memory component 74. The components of processor 72 can communicate with devices external to processor 72 by way of input/output (I/O) component 78. According to one or more embodiments of the invention, I/O component 78 includes a variety of suitable communication interfaces. For example, I/O component 78 can include, for example, wired connections, such as standard serial ports, parallel ports, universal serial bus (USB) ports, S-video ports, local area network (LAN) ports, small computer system interface (SCSI) ports, and so forth. Additionally, I/O component 78 can include, for example, wireless connections, such as infrared ports, optical ports, Bluetooth® wireless ports, wireless LAN ports, or the like. Additionally, display 80, electromagnetic field generator 82, and/or user interface device(s) 84, communicate with processor 72 via I/O component 78.

Processor 72 can be connected to a network, which may be any form of interconnecting network including an intranet, such as a local or wide area network, or an extranet, such as the World Wide Web or the Internet. The network can be physically implemented on a wireless or wired network, on leased or dedicated lines, including a virtual private network (VPN).

In general, navigation system 70 may comprise any tracking system typically employed in image guided surgery, including but not limited to, an electromagnetic tracking system. An example of a suitable electromagnetic tracking subsystem is the AURORA electromagnetic tracking system, commercially available from Northern Digital Inc. (Waterloo, Ontario Canada). In one embodiment, navigation system 70 may include an electromagnetic tracking system, typically comprising an electromagnetic (EM) field generator 82 that emits a series of electromagnetic fields designed to engulf patient 10, and localization elements 24 coupled to PTD 20. In certain embodiments, for example, localization elements 24 are electromagnetic coils that receive an induced voltage from electromagnetic (EM) field generator 82, wherein the induced voltage is monitored and translated by localization device 76 into a coordinate position of localization elements 24. In certain embodiments, localization elements 24 are electrically coupled to twisted pair conductors to provide electromagnetic shielding of the conductors. This shielding prevents voltage induction along the conductors when exposed to the magnetic flux produced by the electromagnetic field generator.

Accordingly, localization device 76 may be, for example, an analog to digital converter that measures voltages induced onto localization elements 24 in the field generated by EM field generator 82; creates a digital voltage reading; and maps that voltage reading to a metric positional measurement based on a characterized volume of voltages to millimeters from electromagnetic field generator 82. Position data associated with localization elements 24 may be transmitted or sent to localization device 76 continuously during the medical procedure performed during the second time interval. Thus, the position of localization elements 24 may be captured at given instants in time during the second time interval. Because localization elements 24 are proximate markers 22, localization device 76 uses the position data of localization elements 24 to deduce coordinates or positions associated with markers 22 during the second time interval. The distance, range, acceleration, and speed between one or more selected pairs of localization elements 24 (and corresponding markers 22) is then determined and various algorithms are used to analyze and compare the distance between selected elements 24 at given instants in time, to the distances between and orientation among corresponding markers 22 observed in a population of pre-procedural images.

Because localization elements 24 of PTD 20 may be tracked continuously during the first and/or second time intervals, a sequence of motion of PTD 20 that represents the motion of an organ of patient 10 or the patient's 10 respiratory cycle may be collected. As patient 10 inhales and exhales, the individual localization elements 24 of PTD 20 will move relative to one another. That is, as patient 10 inhales, the distance between some or all of localization elements 24 of PTD 20 may increase. Conversely, as patient 10 exhales, the distance between some or all of localization elements 24 of PTD 20 may decrease. The sequence of motion of localization elements 24 is tracked by image analysis system 50 and/or navigation system 70 and image analysis system 50 and/or navigation system 70 derives a respiratory signal based on the positions of localization elements 24 during the respiratory cycle of patient 10. The sequence of motion may then be analyzed to find unique similar points within the image dataset and images within the image dataset may be grouped.

According to one particular embodiment, the respiratory signal derived from PTD 20 is used to gate the localization information of a medical device in the airway of patient 10. In other embodiments, the respiratory signal derived from PTD 20 is used during the first time interval to gate the population of images generated by imaging device 40. Using PTD 20 to derive a respiratory signal may assist in determining multiple airway models, for example, by performing a best fit of the real-time patient airway model to the image dataset to derive the optimal registration and gated period in the patient's respiratory cycle. Additionally or alternatively, the respiratory signal may be derived from devices other than PTD 20 that are known in the art for measuring the respiratory cycle of a patient. In certain embodiments, for example, a device that records the resistance between two locations on the patient may be used to measure the respiratory cycle. For example, such a device is similar to a variable potentiometer in that the resistance of the patient changes between two fixed points as the patient inhales and exhales. Thus, the resistance may be measured to create a respiratory signal. In other embodiments, a spirometer may be used to measure the respiratory cycle. In yet other embodiments, a cardiac signal may be used to gate the localization information of a medical device in the airway of patient 10. It will be understood that any type of device for generating a cardiac signal may be used, including, but not limited to an ECG device, PTD 20, etc.

Figure 4:
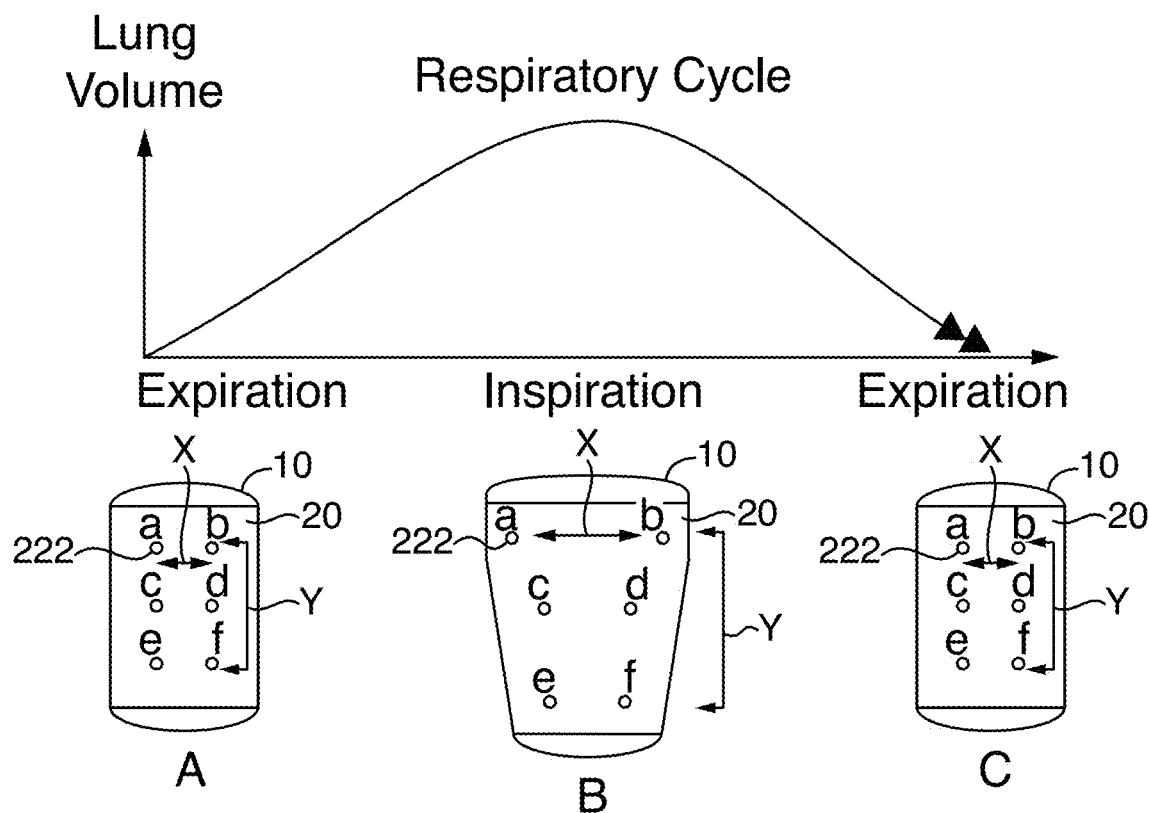
FIG. 4 is a graphical representation illustrating the function of the patient tracking device according to an embodiment of the invention.

FIG. 4 is a schematic illustration indicating how markers 22 of PTD 20 can move and change orientation and shape during movement of patient 10. The graph is one example of how the lung volume can change during inhalation (inspiration) and exhalation (expiration) of patient 10. The corresponding changes in shape and orientation of PTD 20 during inhalation and exhalation are also illustrated. The six markers 22 shown in FIG. 1 are schematically represented and labeled a, b, c, d, e, and f. As described above, a population of images of PTD 20 may be taken during a first time interval. The population of images include an indication of relative position of one or more markers 22; that is, one or more markers 22 are visible in the images, and the position of each marker 22 is then observed over a period of time. A distance between any two markers 22 may then be determined for any given instant of time during the first time interval. For example, a distance X between markers a and b is illustrated, and a distance Y between markers b and f is illustrated. These distances may be determined for any given instant in time during the first time interval from an associated image that illustrates the position and orientation of markers 22. As illustrated, during expiration of patient 10 at times indicated as A and C, the distance X is smaller than during inspiration of patient 10, at the time indicated as B. Likewise, the distance Y is greater during inspiration than during expiration. The distance between any pair of markers 22 may be determined and used in the processes described herein. Thus, the above embodiments are merely examples of possible pair selections. For example, a distance between a position of marker e and a position of marker b may be determined. In addition, multiple pairs or only one pair may be selected for a given procedure.

Figure 5A:
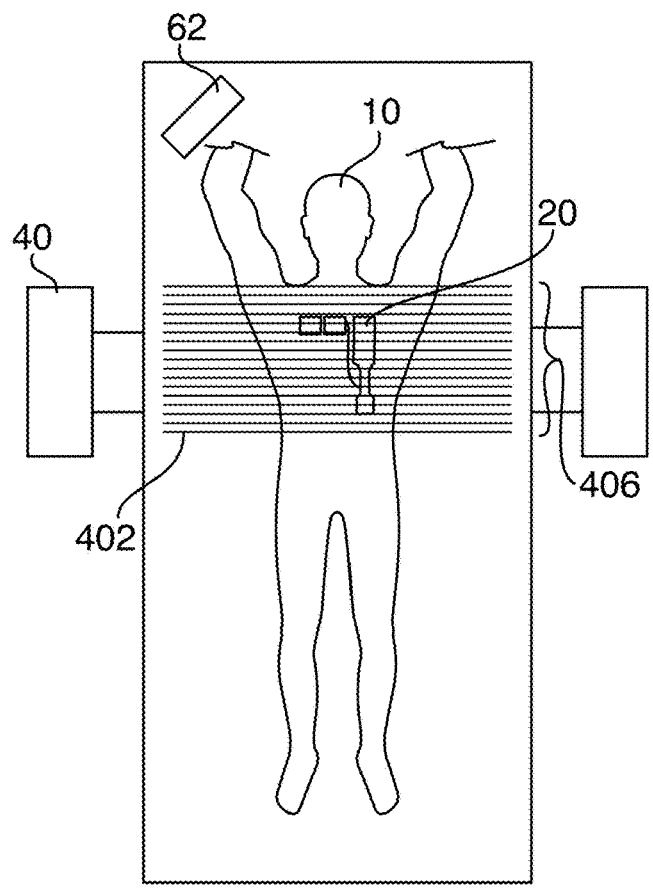
FIG. 5A is an illustration of a patient being imaged using an imaging device according to an embodiment of the invention.
Figure 5B:
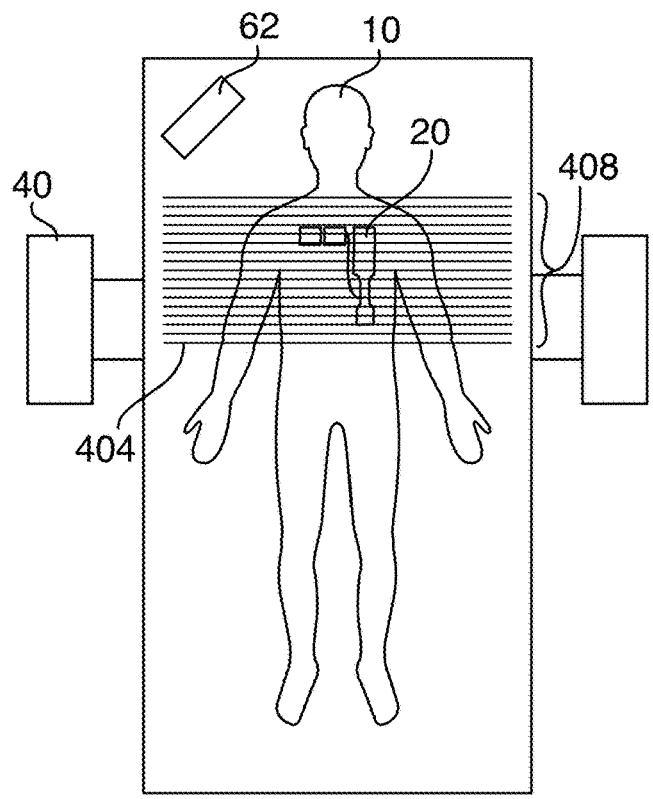
FIG. 5B is an illustration of a patient being imaged using an imaging device according to an embodiment of the invention.

FIGS. 5A and 5B illustrate the generation of a population of images during a first time interval using imaging device 40, PTD 20, and optionally electromagnetic field generator 62 of image analysis system 50. In FIG. 5A, patient 10 inhales and patient 10 is scanned using imaging device 40 which generates a population of images 402 of the anatomy of patient 10 and markers 22 at inspiration. As shown, patient 10 may place their arms above their head as they inhale, and this may be considered a total lung capacity (TLC) scan. In FIG. 5B, patient 10 exhales and patient 10 is scanned using imaging device 40 which generates a population of images 404 of the anatomy of patient 10 and markers 22 at expiration. As shown, patient 10 may place their arms below their head, and this may be considered a functional residual capacity (FRC) scan. The Functional Residual Capacity is the lung volume at the end of a normal expiration, when the muscles of respiration are completely relaxed. At FRC (and typically at FRC only), the tendency of the lungs to collapse is exactly balanced by the tendency of the chest wall to expand. In various embodiments, the population of images 402, 404 may be two-dimensional (2D) images. In other embodiments, for example, the population of images 402, 404 may be three-dimensional (3D) images. Additionally, the population of images 402, 404 may be respiratory gated by tracking the location of localization elements 24 of PTD 20 by image analysis system 50 and/or navigation system 70 using EM field generator 62, 82 during image generation. In other embodiments, for example, the population of images 402, 404 may be gated using any type of device known for generating a physiological signal for gating.

In various embodiments, for example, instead of patient 10 holding an inspiration or expiration state, a cine loop of images may be generated in conjunction with the patient's respiratory cycle information from PTD 20. Thus the cine loop comprises a population of images generated from inspiration to expiration where the population of images are gated to the respiratory cycle of patient 10 using PTD 20. This can serve to limit registration point selection, in order to be consistent with the patient's respiratory cycle that a 3D dataset such as CT, MR, or PET has acquired. This technique advantageously maximizes registration accuracy, a major flaw in conventional systems in the prior art.

Figure 5C:
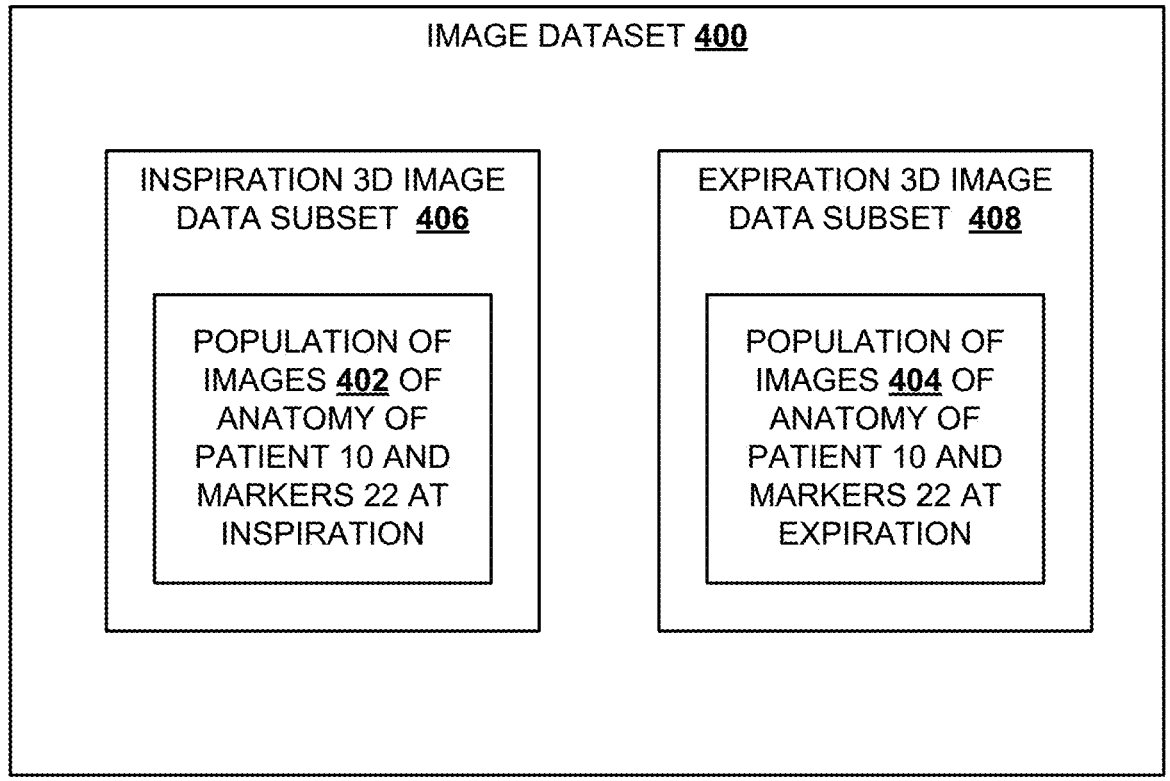
FIG. 5C is a schematic illustration of an image dataset according to an embodiment of the invention.

As described above, imaging device 40 is in data communication with image analysis system 50 and/or navigation system 70 and sends, transfers, copies and/or provides the population of images 402, 404 taken during the first time interval associated with patient 10 to image analysis system 50 and/or navigation system 70. As shown in FIG. 5C, image analysis system 50 and/or navigation system 70 compiles the population of images 402 at inspiration into a 3D image data subset 406 of the anatomy of patient 10 and markers 22 at inspiration (referred to herein as inspiration 3D image data subset 406). Additionally, image analysis system 50 and/or navigation system 70 compiles the population of images 404 at expiration into a 3D image data subset 408 of the anatomy of patient 10 at expiration (referred to herein as expiration 3D image data subset 408). The inspiration 3D image data subset 406 and the expiration 3D image data subset 408 are then stored in an image dataset 400 in memory component 54, 74 of image analysis system 50 and/or navigation system 70.

Additionally, acquiring a population of images at both inspiration and expiration may assist navigation of a steerable catheter during a second time interval. Referring now to FIGS. 6A-6C, in addition to segmenting the markers 22 of PTD 20 from the population of images 402, 404 generated during the first time interval, processor 52 of image analysis workstation 50 generates three-dimensional models of the airway of patient 10 by segmenting the 3D image data subsets 406, 408. In various embodiments, segmentation of the airway may be accomplished using an iterative region growing technique wherein a seed voxel in the airway is selected as an initialization parameter. Voxels neighboring the seed voxel are then evaluated to determine whether they are a part of the airway, form the wall surrounding the airway, or form other tissue. Following segmentation, a surface mesh of the airway may be generated to produce a surface skeleton. The surface of the airway may then be rendered. Other segmentation methods are described herein below, including methods for localized segmentation extension in a region of interest.

As shown in FIG. 6A, a three-dimensional model of the airway of patient 10 at inspiration ("inspiration 3D airway model 410") is generated by segmenting the inspiration 3D image data subset 406. FIG. 6A shows an Inspiration/arms-up pathway registration; this is, generally speaking, the preferred image scan acquisition state for automatic segmentation of the tracheo-bronchial tree. Processor 52 may also segment one or more target tissues 420 (e.g., lesions, lymph nodes, blood vessels, tumors, etc.) which may be navigated to during a second time interval using a variety of medical devices as described more fully elsewhere herein. The segmentation of the target tissue(s) 420 may be refined to define different characteristics of the target tissue, such as, for example, density of the target tissue. Additional image data formats may also be loaded into processor 52, such as, for example, PET or MR and processor 52 may be able to map the CT, PET, and/or MR data to one another. As described herein below, an initial segmentation of an image(s) or image dataset(s) can be extended in a region of interest to aid in navigation or for other use.

As shown at FIG. 6B, a three-dimensional model of the airway of patient 10 at expiration ("expiration 3D airway model 412") is generated by segmenting the expiration 3D image data subset 408. As discussed above, a variety of segmentation algorithms known in the art may be used to generate the initial inspiration and expiration 3D airway models 410, 412. Methods for extending the initial segmentation are described herein below. FIG. 6B shows, in contrast to FIG. 6A, an FRC/arms-down segmentation. Because the patient's 10 lungs are more full of air at inspiration than at expiration, the inspiration 3D airway model 410 includes more structure than the expiration 3D airway model 412. Accordingly, as shown in FIG. 6B, expiration 3D airway model 412 includes fewer structure(s) and the structure(s) are in different locations and/or orientations than at inspiration. However during a procedure such as directing a navigated steerable catheter to a target tissue within the airway of patient 10 (e.g., during a second time interval), the breathing cycle of patient 10 may be closer to tidal breathing. That is, patient 10 usually never reaches full inspiration during the procedure and thus if the segmentation of the airways of patient 10 at inspiration is used for navigation purposes, there will be significant error in the registration of the segmented airway to patient 10.

In certain embodiments, a hybrid "Inspiration-Expiration" 3D airway model 414 is constructed as shown in FIG. 6C using the inspiration 3D airway model 410 and the expiration 3D airway model 412. The hybrid "Inspiration-Expiration" 3D airway model 414 may be used to reduce or eliminate the errors in registration. To construct the hybrid "Inspiration-Expiration" 3D airway model 414, a population of deformation vector fields is calculated by processor 52, 72 of image analysis system 50 and/or navigation system 70. The deformation vector field comprises vectors from one or more voxels in the inspiration 3D airway model 410 to one or more corresponding voxels in the expiration 3D airway model 412. After the deformation vector field is calculated, the inspiration 3D airway model 410 is deformed to the expiration state of patient 10 using the deformation vector field. Accordingly, the voxels in the inspiration 3D airway model 410 are deformed to match the location, shape, and orientation of the airways of patient 10 at expiration. This results in the hybrid "Inspiration-Expiration" 3D airway model 414, wherein the hybrid "Inspiration-Expiration" 3D airway model 414 contains all of the structural information of the airways of patient 10 depicted in inspiration 3D airway model 410. However, this structural information is now more closely matched to the location, shape, and orientation of the airways of patient 10 depicted in expiration 3D airway model 412. Accordingly, the deformation vectors represent not only a change in location of the structure of the airway but a change in shape of the structure of the airway from inspiration to expiration.

Figure 7:
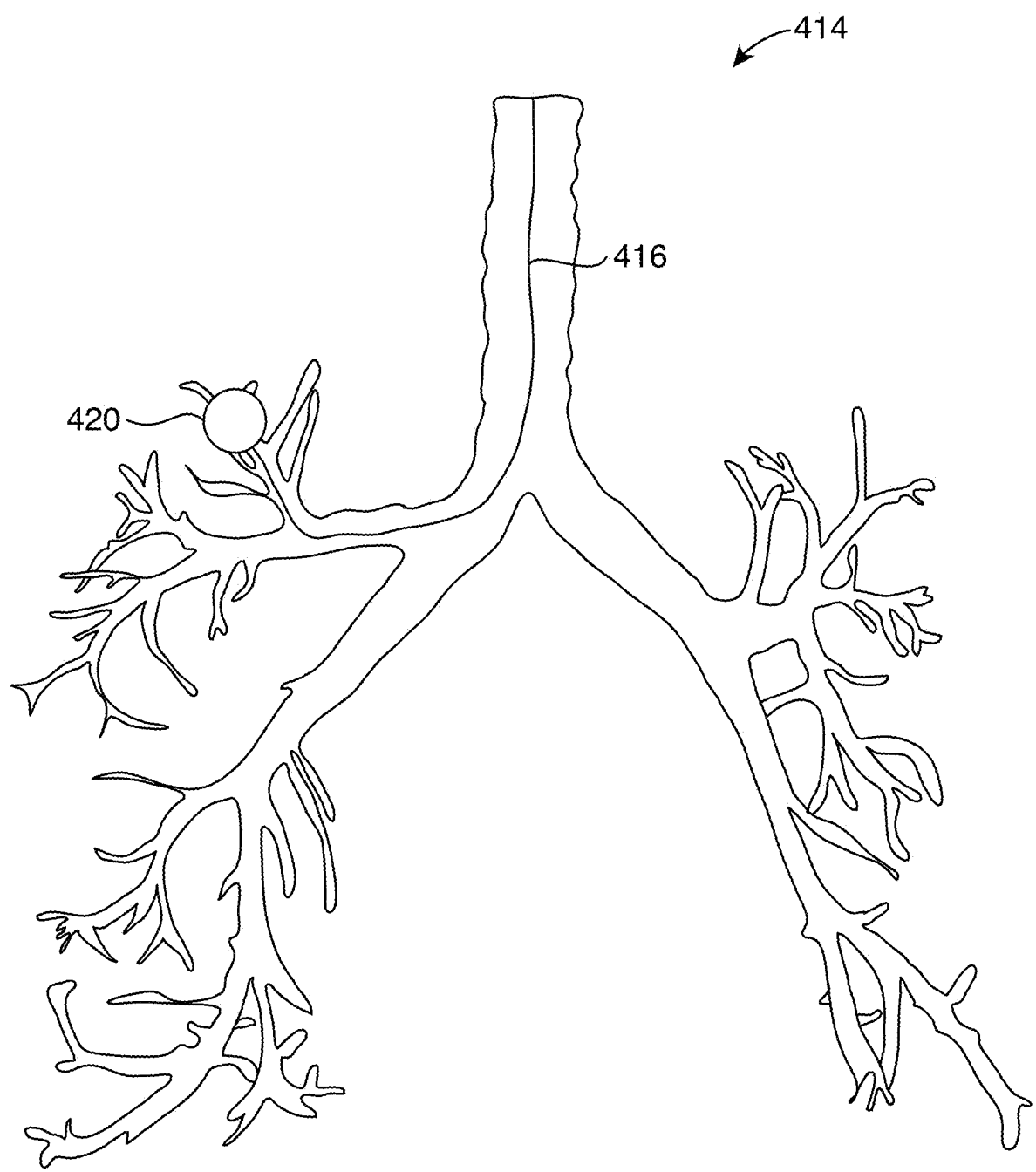
FIG. 7 is a front perspective view of a hybrid "Inspiration-Expiration" 3D airway model according to an embodiment of the invention.

FIG. 7, illustrates a 3D representation of hybrid "Inspiration-Expiration" 3D airway model 414 which includes a target tissue 420 segmented by processor 52, 72. This 3D representation of hybrid "Inspiration-Expiration" 3D airway model 414 may include surface information. Hybrid "Inspiration-Expiration" 3D airway model 414 may additionally include navigation pathway 416. Image analysis system 50 and/or navigation system 70 may calculate navigation pathway 416 from the entry of the airway to the location of target tissue 420. In certain embodiments, navigation pathway 416 may be an optimal endobronchial path to a target tissue. For example, navigation pathway 416 may represent the closest distance and/or closest angle to the target tissue. A physician or other healthcare professional may follow navigation pathway 416 during an image guided intervention to reach the location of target tissue 420.

Although target tissue 420 locations and navigation pathway(s) 416 may be automatically calculated by image analysis system 50 and/or navigation system 70, a physician or other healthcare professional may manually adjust target tissue 420 locations and/or navigation pathway(s) 416. As described herein with reference to FIGS. 14-19, the navigation pathway 416 can be improved based on additional information obtained during localized segmentation extension methods according to embodiments set forth below.

In general, the embodiments described herein have applicability in "Inspiration to Expiration"-type CT scan fusion. According to various methods, the user navigates on the expiration 3D image data subset 408 for optimal accuracy, while using the inspiration 3D image data subset 406 to obtain maximum airway segmentation. In one embodiment, for example, a user could complete planning and pathway segmentation on the inspiration 3D image data subset 406 of patient 10. Preferably, a deformation vector field is created between at least two datasets (e.g., from inspiration 3D image data subset 406 to expiration 3D image data subset 408). The deformation or vector field may then be applied to the segmented vessels and/or airways and navigation pathway 416 and target tissue 420 locations. In these and other embodiments, the deformation or vector field may also be applied to multiple image datasets or in a progressive way to create a moving underlying image dataset that matches the respiratory or cardiac motion of patient 10.

By way of example, in certain embodiments, "Inspiration to Expiration" CT fusion using the lung lobe centroid and vector change to modify an airway model may also be applicable. In accordance with various embodiments, this technique is used to translate and scale each airway based on the lung lobe change between inspiration images and expiration images. The lung is constructed of multiple lobes and these lobes are commonly analyzed for volume, shape, and translation change. Each lobe changes in a very different way during the patient's breathing cycle. Using this information to scale and translate the airways that are located in each lobe, it is possible to adapt for airway movement. This scaled airway model may then be linked to the 4D tracking of the patient as described herein.

In various aspects, the systems and methods described herein involve modifying inspiration images generated by imaging device 40 (e.g., CT, CT/PET, MRI, etc.) to the expiration cycle for navigation. It is well understood that the patient's airways are contained within multiple lobes of the lung. It is also understood that airways significantly change between inspiration and expiration. In certain embodiments, to increase the accuracy of the map for navigation, it may be beneficial to include the detail of the inspiration images, coupled with the ability to navigate it accurately during expiration. For many patients, the expiration state may be the most repeatable point in a patient's breath cycle. In preferred embodiments, this modification may be carried out in accordance with the following steps:

1) Generate a population of images of patient 10 at both inspiration and expiration using imaging device 40;

2) Segment the airways in both the inspiration and expiration images;

3) Segment the lung lobes in both the inspiration and expiration images (as the lung lobes are identifiable in both the inspiration and expiration images with a high degree of accuracy);

4) Determine a volume difference for each lung lobe between inspiration and expiration, use this change to shrink the airway size from the inspiration to the expiration cycle. Preferably, this is done for each individual lobe, as the percentage change will typically be different for each lobe.

5) Determine the centroid for each lung lobe and the vector change in motion from the main carina in both inspiration images and expiration images. This vector may then be used to shift the airways that are associated with each lung lobe. A centroid for the airway may be calculated based on the segmented branches. For each airway branch in the segmentation, it includes a tag that associates it with the respective lung lobe. The central airway including the main carina and initial airway branches for each lobe that is linked according to the expiration scan location of these points. Next, a plane may be defined using the main carina and initial airway branch exits to determine the vector change for each lobe.

Among the lobes to modify, for example:

left inferior lobe—the bottom lobe of the lung on the left side of patient 10;

left superior lobe—the top lobe of the lung on the left side of patient 10.

right inferior lobe—the bottom lobe of the lung on the right side of patient 10;

right middle lobe—the middle lobe of the lung on the right side of patient 10;

right superior lobe—the top lobe of the lung on the right side of patient 10.

Exemplary calculations are as follows:

Inspiration Airway–Left Inferior Lobe (LIL)–70% (reduction in volume Inspiration to Expiration calculated)=ExAirwayLIL;

Determine Expiration Central Airway points (Main Carina and Initial Airway branches) based upon segmentation;

Shift ExAirwayLIL by vector distance (3 cm, 45 degrees up and back from main carina) that LIL centroid moved from inspiration to expiration.

Preferably, this process is repeated for each lobe. In certain embodiments, the completion of 5 lobes will result in a hybrid "Inspiration-Expiration" 3D airway model for patient 10.

In various embodiments, the target location for the patient may be selected in the expiration images and applied to the hybrid "Inspiration-Expiration" 3D airway model 414. Alternatively, it may be selected in the inspiration images and adjusted based on the same or similar criteria as the inspiration airways. In either case, it may be adjusted individually or linked to the airway via a 3D network and moved in the same transformation.

A deformation field may also be included in the analysis in various other embodiments described herein. For example, the deformation field may be applied to fuse 3D fluoroscopic images to CT images to compensate for different patient orientations, patient position, respiration, deformation induced by the catheter or other instrument, and/or other changes or perturbations that occur due to therapy delivery or resection or ablation of tissue.

Following the generation of hybrid "Inspiration-Expiration" 3D airway model 414, during a second time interval, a medical procedure is then performed on patient 10 with PTD 20 coupled to patient 10 at the same location as during the first time interval when the population of pre-procedural images were taken. Preferably, the second time interval immediately follows the first time interval. However, in certain embodiments, second time interval may occur several hours, days, weeks or months after the first time interval. After hybrid "Inspiration-Expiration" 3D airway model 414 is generated and one or more target tissues 420 are identified and one or more navigation pathways 416 are calculated, this information is transferred from image analysis system 50 to navigation system 70. This transfer may be done according to the DICOM (Digital Imaging and Communications in Medicine) standard as known in the art. It will be understood that the transfer may be done using any method and according to any standard without departing from the scope of the invention. For example, this transfer may be accomplished between image analysis system 50 to navigation system 70 using a variety of methods, including, but not limited to, a wired connection, a wireless connection, via CD, via a USB device, via disk, etc.

It should be noted that image dataset 400 may be supplemented, replaced or fused with an additional image dataset. In one embodiment, for example, during the second time interval an additional population of images may be taken. In other embodiments, for example, after the second time interval an additional population of images may be taken. By generating one or more additional image datasets, potential changed physical parameters of patient such as patient 10 movement, anatomical changes due to resection, ablation, general anesthesia, pneumothorax, and/or other organ shift may be accounted for during the procedure. Accordingly, images from CT-Fluoro, fluoroscopic, ultrasound or 3D fluoroscopy may be imported into image analysis system 50 and/or navigation system 70.

Using the respiratory signal derived from PTD 20, navigation system 70 selects an image from the population of pre-procedural images 402, 404 taken during the first time interval that indicates a distance or is grouped in a similar sequence of motion between corresponding markers 22 at a given instant in time, that most closely approximates or matches the distance or similar sequence of motion between the selected localization elements 24. The process of comparing the distances is described in more detail below. Thus, navigation system 70 displays images corresponding to the actual movement of the targeted anatomy during the medical procedure being performed during the second time interval. The images illustrate the orientation and shape of the targeted anatomy during a path of motion of the anatomy, for example, during inhaling and exhaling.

Figure 8:
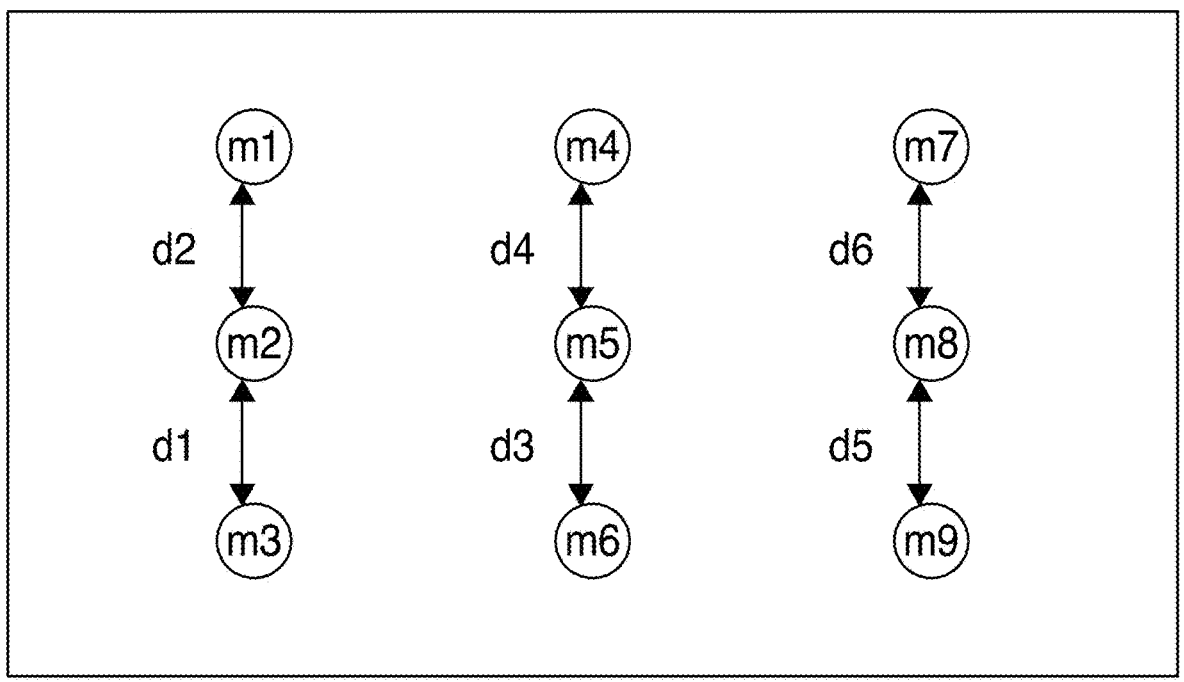
FIG. 8 is a schematic illustrating vector distances of the patient tracking device according to an embodiment of the invention.

FIG. 8 illustrates an example set of distances or vectors d1 through d6 between a set of markers 22, labeled m1 through m9 that are disposed at spaced locations on PTD 20. As described above, a population of pre-procedural images is taken of a patient 10 to which PTD 20 is coupled during a first time interval. The distances between markers 22 are determined for multiple instants in time through the path of motion of the dynamic body (e.g., the respiratory cycle of the patient). Then, during a medical procedure, performed during a second time interval, localization elements 24 (not shown in FIG. 8) proximate the location of markers 22 provide position data for localization elements 24 to localization device 76 (not shown in FIG. 8). Navigation system 70 uses the position data to determine distances or vectors between localization elements 24 for multiple instants in time during the medical procedure or second time interval.

Figure 9A:
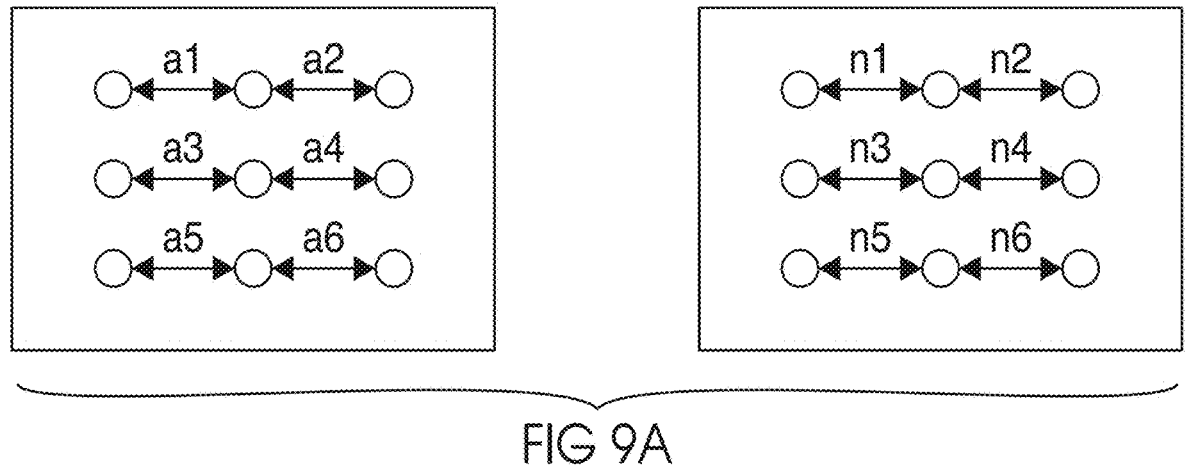
FIG. 9A is a schematic illustrating vector distances from a localization element on the patient tracking device according to an embodiment of the invention.

FIG. 9A shows an example of distance or vector data from localization device 76. Vectors a1 through a6 represent distance data for one instant in time and vectors n1 through n6 for another instant in time, during a time interval from a to n. As previously described, the vector data may be used to select an image from the population of pre-procedural images that includes distances between the markers m1 through m9 that correspond to or closely approximate the distances a1 through a6 for time a, for example, between the localization elements. The same process may be performed for the vectors n1 through n6 captured during time n.

Figure 9B:
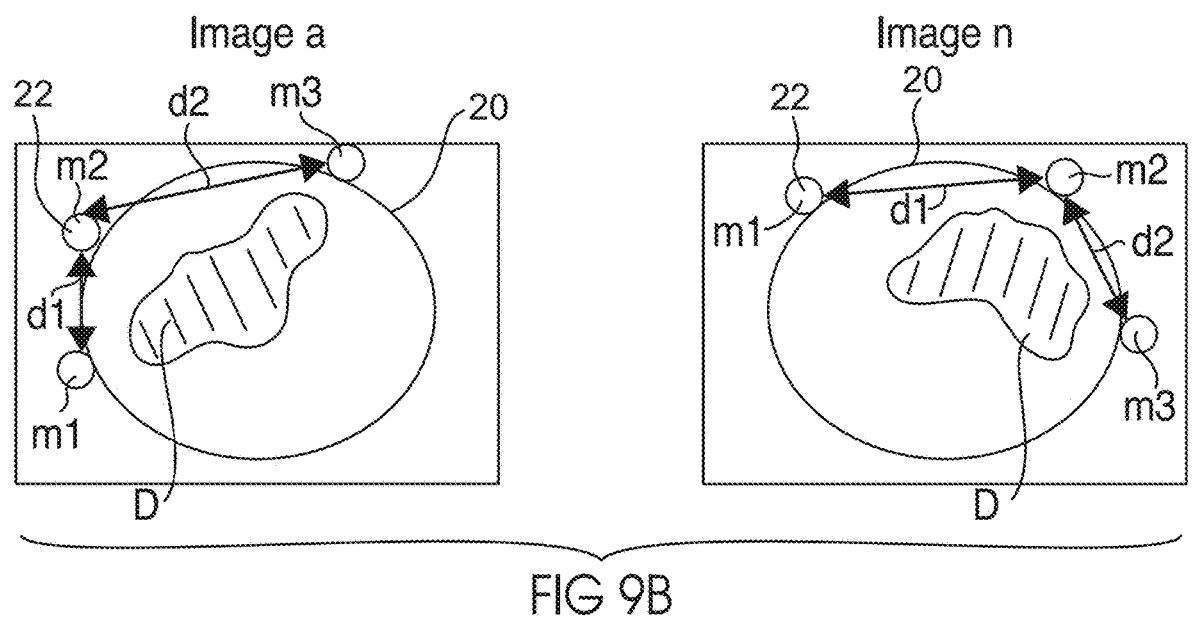
FIG. 9B is a schematic illustrating vector distances from an image dataset according to an embodiment of the invention.

One method of selecting the appropriate image from the population of pre-procedural images 402, 404 is to execute an algorithm that sums all of the distances a1 through a6 and then search for and match this sum to an image containing a sum of all of the distances d1 through d6 obtained pre-procedurally from the image data that is equal to the sum of the distances a1 through a6. When the difference between these sums is equal to zero, the relative position and orientation of the anatomy or dynamic body D during the medical procedure will substantially match the position and orientation of the anatomy in the particular image. The image associated with distances d1 through d6 that match or closely approximate the distances a1 through a6 may then be selected and displayed. For example, FIG. 9B illustrates examples of pre-procedural images, Image a and Image n, of a dynamic body D that correspond to the distances a1 through a6 and n1 through n6, respectively. An example of an algorithm for determining a match is as follows:

Does $\Sigma ai = \Sigma di$ ($i=1$ to 6 in this example) OR

Does $\Sigma(ai-di) = 0$ ($i=1$ to 6 in this example).

If yes to either of these, then the image is a match to the vector or distance data obtained during the medical procedure.

Figure 10:
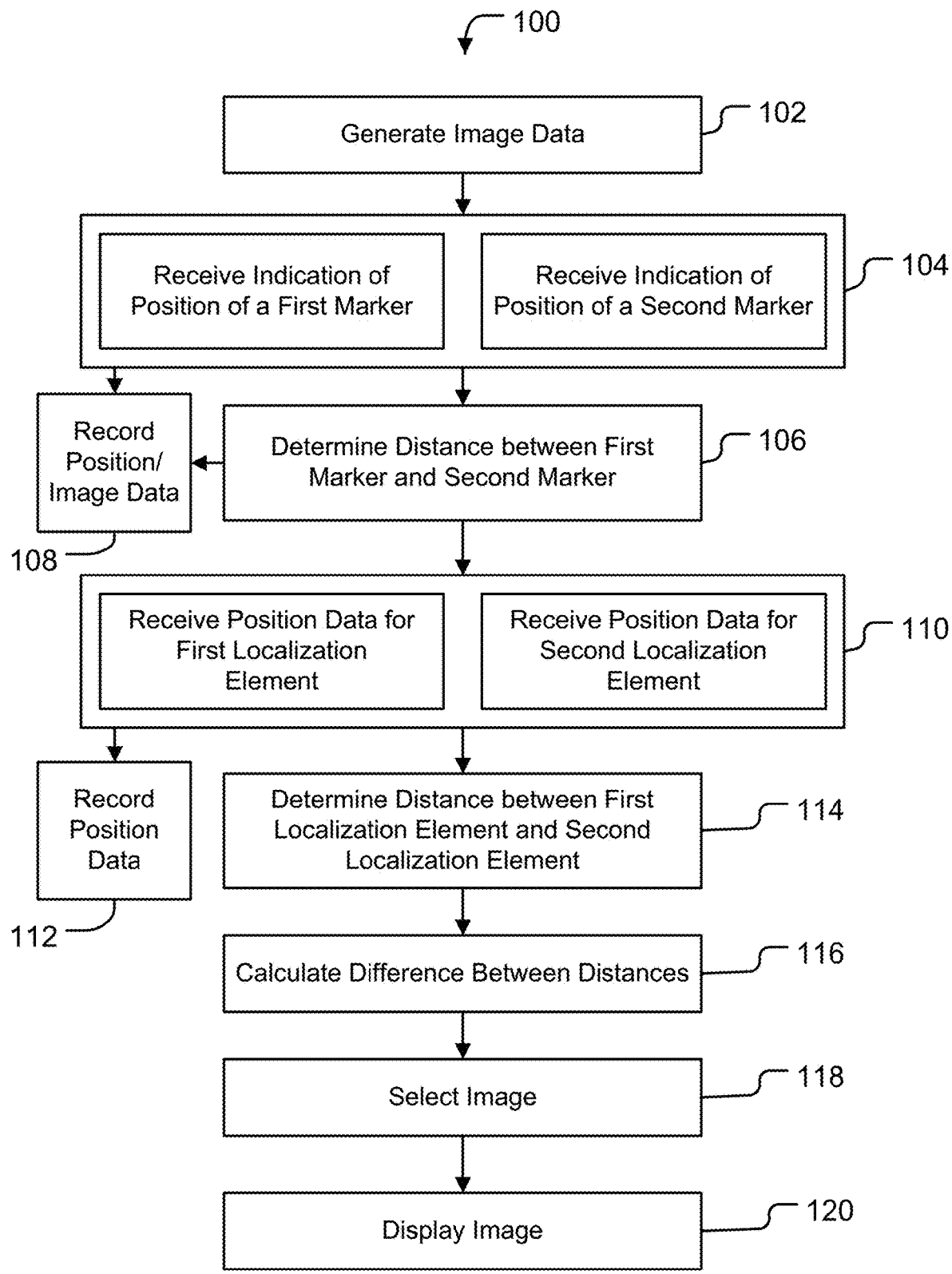
FIG. 10 is a flowchart illustrating a method according to an embodiment of the invention.

FIG. 10 is a flowchart illustrating a method according to an embodiment of the invention. A method 100 includes at step 102 generating image data during a pre-procedural or first time interval. As discussed above, a population of images are generated of a dynamic body, such as patient 10, using imaging device 40 (e.g., CT Scan, MRI, etc.). The image data is associated with one or more images generated of PTD 20 coupled to a dynamic body, where PTD 20 includes two or more markers 22. In other words, the image data of the dynamic body is correlated with image data related to PTD 20. The one or more images may be generated using a variety of different imaging devices as described previously. The image data include an indication of a position of a first marker and an indication of a position of a second marker, as illustrated at step 104. The image data include position data for multiple positions of the markers during a range or path of motion of the dynamic body over a selected time interval. As described above, the image data include position data associated with multiple markers, however, only two are described here for simplicity. A distance between the position of the first marker and the position of the second marker is determined for multiple instants in time during the first time interval, at step 106. As also described above, the determination may include determining the distance based on the observable distance between the markers on a given image. The image data, including all of the images received during the first time interval, the position, and the distance data is recorded in a memory component at step 108.

Then at step 110, during a second time interval, while performing a medical procedure on patient 10 with PTD 20 positioned on patient 10 at substantially the same location, position data is received for a first localization element and a second localization element. Localization elements 24 of PTD 20 are proximate markers 22, such that the position data associated with localization elements 24 is used to determine the relative position of markers 22 in real-time during the medical procedure. The position data of localization elements 24 are recorded in a memory component at step 112.

A distance between the first and second localization elements is determined at step 114. Although only two localization elements 24 are described, as with the markers, position data associated with more than two localization elements may be received and the distances between the additional localization elements may be determined.

The next step is to determine which image from the population of images taken during the first time interval represents the relative position and/or orientation of the dynamic body at a given instant in time during the second time interval or during the medical procedure. To determine this, at step 116, the distance between the positions of the first and second localization elements at a given instant in time during the second time interval determined in step 114 are compared to the distance(s) determined in step 106 between the positions of the first and second markers obtained with the image data during the first time interval.

An image is selected from the first time interval that best represents the same position and orientation of the dynamic body at a given instant in time during the medical procedure. To do this, the difference between the distance between a given pair of localization elements during the second time interval is used to select the image that contains the same distance between the same given pair of markers from the image data received during the first time interval. This is accomplished, for example, by executing an algorithm to perform the calculations. When there are multiple pairs of markers and localization elements, the algorithm may sum the distances between all of the selected pairs of elements for a given instant in time during the second time interval and sum the distances between all of the associated selected pairs of markers for each instant in time during the first time interval when the pre-procedural image data was received.

When an image is found that provides the sum of distances for the selected pairs of markers that is substantially the same as the sum of the distances between the localization elements during the second time interval, then that image is selected at step 118. The selected image is then displayed at step 120. The physician or other healthcare professional may then observe the image during the medical procedure. Thus, during the medical procedure, the above process may be continuously executed such that multiple images are displayed and images corresponding to real-time positions of the dynamic body may be viewed.

In addition to tracking the location of PTD 20, navigation system 70 (see FIG. 3) may also track any type of device which includes one or more localization elements. The localization elements in the medical devices may be substantially similar or identical to localization elements 24 of PTD 20. The devices preferably include medical devices, including, but not limited to, steerable catheters, needles, stents, ablation probes, biopsy devices, guide wires, forceps devices, brushes, stylets, pointer probes, radioactive seeds, implants, endoscopes, energy delivery devices, therapy delivery devices, delivery of energy activated substances (e.g., porfimer sodium) and energy devices, radiofrequency (RF) energy devices, cryotherapy devices, laser devices, microwave devices, diffuse infrared laser devices, etc. In certain embodiments, the location of these devices are tracked in relation to PTD 20. In other embodiments, for example, these devices are tracked in relation to electromagnetic field generator 62, 82. It is also envisioned that at least some of these medical devices may be wireless or have wireless communications links. It is also envisioned that the medical devices may encompass medical devices which are used for exploratory purposes, testing purposes or other types of medical procedures. Tracked or navigated devices can be used to supplement segmentation information, as described herein below.

One embodiment of a medical device which may be tracked by navigation system 70 is illustrated in FIGS. 11 and 11A. In one embodiment of the present invention, a navigated surgical catheter that is steerable 600 (referred herein to as "steerable catheter") may be used to gain access to, manipulate, remove, sample or otherwise treat tissue within the body including, but not limited to, for example, heart or lung tissue. Steerable catheter 600 comprises an elongate flexible shaft 602 having a proximal end portion 604, a distal end portion 606 terminating in tip 607, and one or more working channels 608 extending from proximal end portion 604 to tip 607. As shown in FIG. 11A, one or more localization elements 610 that are detectable by navigation system 70 are disposed proximate the distal end portion 606 of elongate flexible shaft 602. Accordingly, the position and orientation (POSE) of localization elements 610 are tracked by localization device 76 of navigation system 70. The one or more localization elements 610 are connected by wire 611 to navigation system 70; in alternative embodiments, the one or more localization elements 610 may be wirelessly connected to navigation system 70. In certain embodiments, localization elements 610 comprise six (6) degree of freedom (6 DOF) electromagnetic coil sensors. In other embodiments, localization elements 610 comprise five (5) degree of freedom (5 DOF) electromagnetic coil sensors. In other embodiments, localization elements 610 comprise other localization devices such as radiopaque markers that are visible via fluoroscopic imaging and echogenic patterns that are visible via ultrasonic imaging. In yet other embodiments, localization elements 610 may be, for example, infrared light emitting diodes, and/or optical passive reflective markers. Localization elements 610 may also be, or be integrated with, one or more fiber optic localization (FDL) devices. Accordingly, in certain embodiments, localization elements 610 may be substantially similar or identical to localization elements 24 of PTD 20. In other embodiments the steerable catheter may be non-navigated, such that it does not include any localization elements.

Steerable catheter 600 further comprises handle 612 attached to the proximal end portion 604 of elongate flexible shaft 602. Handle 612 of steerable catheter 600 includes steering actuator 614 wherein distal end portion 606 is moved "up" and "down" relative to proximal end portion 604 by manipulating steering actuator 614 "up" and "down," respectively. Additionally, distal end portion 606 is moved "left" and "right" relative to proximal end portion 604 by rotating handle 612 "left" and "right," respectively, about handle longitudinal axis 613. It will be understood that steering actuator 614 and handle 612 are connected to a steering mechanism (not shown) on the inside of steerable catheter 600 which is connected to distal end portion 606 of elongate flexible shaft 602 for causing the deflection in distal end portion 606. Port 616, disposed on handle 612, provides access to working channel(s) 608 in elongate flexible shaft

602 of steerable catheter 600, such that a medical device may be inserted into working channel(s) 608 through port 616.

Figure 12A:
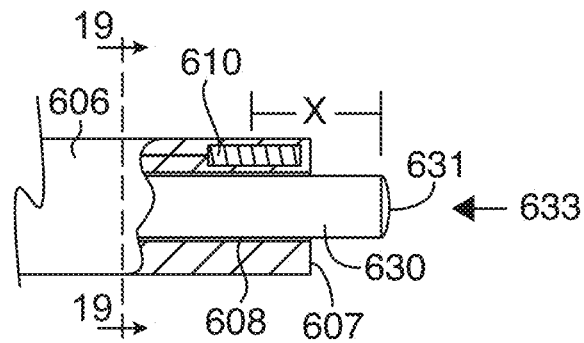
FIG. 12A is a left partial cut away view of a steerable catheter according to an embodiment of the invention.
Figure 12B:
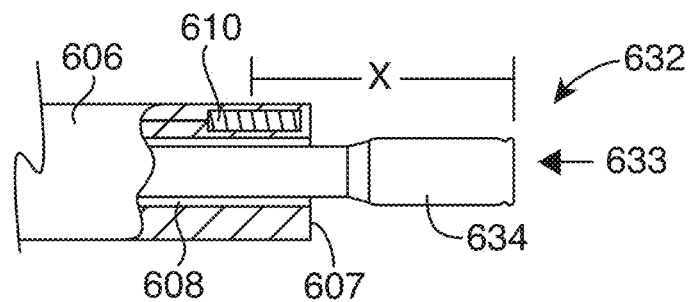
FIG. 12B is a left partial cut away view of a steerable catheter according to an embodiment of the invention.

As shown in FIGS. 12A and 12B, any number of medical devices or therapies may be inserted into working channel(s) 608 and/or extended out of tip 607 to deliver the medical devices or therapies to a target tissue. The medical devices may include, but are not limited to, imaging devices 633, tissue sensing devices 632, biopsy devices, therapy devices, steerable catheters, endoscopes, bronchoscopes, percutaneous devices, percutaneous needles, pointer probes, implants, stents, guide wires, stylets, etc. In certain embodiments, imaging devices 633 include, but are not limited to, bronchoscopic video cameras 630, endobronchial ultrasound (EBUS) devices 634, optical coherence tomography (OCT) devices, probe based Confocal Laser Endomicroscopy (pCLE) devices, or any known imaging device insertable into working channel 608 of steerable catheter 600. Tissue sensing device 632 may be any type of device which may be used to determine the presence of a target tissue in patient 10. In certain embodiments, tissue sensing device 632 may include, but is not limited to, imaging device 633, a cell analysis device, a cancer detecting device, an exhaled breath condensate analyzer, a physiological characteristic sensor, a chemical analysis device, an aromatic hydrocarbon detection device, vacuum collection device, etc. The sensitivity of certain of the tissue sampling devices, such as aromatic hydrocarbon detection devices are dependent upon the density of the sample collected. Thus, by navigating steerable catheter 600 near the desired target tissue a sample of higher density may be captured and analyzed. Additionally, a vacuum collection device may be navigated using steerable catheter 600 to near the desired target tissue and/or an airway branch within one or two segments of the desired target tissue, and an air sample may be captured. In certain embodiments, therapy devices include, but are not limited to, ablation probes, energy delivery devices, radioactive seeds, delivery of energy activated substances (e.g., porfimer sodium) and energy devices, radiofrequency (RF) energy devices, cryotherapy devices, laser devices, microwave devices, diffuse infrared laser devices, fluids, drugs, combinations thereof, or the like). In certain embodiments, biopsy devices include, but are not limited to, needles, forceps devices, brushes, etc. In certain embodiments, steerable catheter 600 may also include a suction capability.

As illustrated in FIG. 12A, for example, in certain embodiments, imaging device 633 is a bronchoscopic video camera 630. Bronchoscopic video camera 630 may be inserted into working channel 608 and/or extended out distal end portion 606 of navigated steerable catheter 600. By inserting bronchoscopic video camera 630 into working channel 608 of steerable catheter 600, steerable catheter 600 may be used like a typical steerable bronchoscope, as described more fully elsewhere herein.

As shown in FIG. 12B, tissue sensing device 632 may be an imaging device 633, wherein imaging device 633 is an endobronchial ultrasound (EBUS) device 634; however, as described above, it will be understood that imaging device 633 may include, but is not limited to, bronchoscopic video camera 630, an optical coherence tomography (OCT) device, a probe based Confocal Laser Endomicroscopy (pCLE) device, or any known imaging device insertable into working channel 608 of steerable catheter 600.

In embodiments, where tissue sensing device 632 is imaging device 633, imaging device 633 may be able to generate a population of images of the target tissue(s), wherein the target tissue(s) may be in the airway, on the wall of the airway, in the wall of the airway, and/or beyond the wall of the airway. That is, the imaging device(s) may be able to generate images of target tissue(s) not only inside the airway, but may generate images of target tissue(s) and other anatomical structures inside and/or beyond the wall of the airway. Thus in certain embodiments, sub-surface target tissue may be imaged using the imaging device(s). Accordingly, using endobronchial ultrasound (EBUS) device 634, an optical coherence tomography (OCT) device, a probe based Confocal Laser Endomicroscopy (pCLE) device, etc. while tracking the position and orientation (POSE) of localization element 610 of steerable catheter 600, as described herein, multiple 3D volumes of image data regarding target tissue(s) and other anatomical structures inside and/or beyond the wall of the airway may be collected and a larger 3D volume of collected data may be constructed. Knowing the 3D location and orientation of the multiple 3D volumes will allow the physician or other healthcare professional to view a more robust image of, for example, pre-cancerous changes of target tissue(s) in patient 10. This data may also be correlated to pre-acquired or intra-procedurally acquired image dataset 400 to provide additional information.

Additionally, in certain embodiments wherein steerable catheter 600 includes multiple working channels 608, multiple medical devices may be inserted into the multiple working channels 608. For example, bronchoscopic video camera 630 may be inserted into one working channel and a medical device such as a needle, forceps device or a brush may be inserted into a second working channel. Accordingly, a real-time image feed from bronchoscopic video camera 630 may be used to view the operation of the medical device. Although a steerable catheter has been described, it will be understood that any type of steerable medical device may be used in accordance with the methods described herein, including, but not limited to, endoscopes, bronchoscopes, etc. without departing from the scope of the invention. It is understood that other medical devices may be tracked by navigation system 70, such as a percutaneous needle or other device, such as described in U.S. Ser. No. 15/290,822, for example, the entirety of which is incorporated herein by reference.

In various embodiments, any of the medical devices described herein that may be inserted into working channel(s) 608, 658 of steerable catheter 600 and/or other medical devices may be tracked individually with an integrated localization element (e.g., an electromagnetic (EM) sensor). Accordingly, the medical devices may be tip tracked. Additionally, wherein the inserted medical device is an ablation probe, ablation models may be displayed to assist in optimal placement of the ablation probe for treatment. It will be understood that the medical devices may be delivered endobronchially, percutaneously, and/or endobronchially and percutaneously simultaneously.

Referring again to navigation system 70, navigation system 70 may display on display 80 multiple images which may assist a physician or other healthcare professional in conducting the methods described herein. Image dataset 400 generated during the first time interval may be registered to patient 10 using PTD 20. As described above, localization elements 24 of PTD 20 are proximate markers 22 and because one or more markers 22 of PTD 20 are visible in image dataset 400 and localization elements 24 corresponding to the one or more markers 22 are tracked by navigation system 70, image dataset 400 may be registered to patient 10. This registration may be manually accomplished or may be automatically accomplished by navigation system 70.

In addition to or alternative to registration using PTD 20, registration may be completed by different known techniques. First, point-to-point registration may be accomplished by identifying points in an image space and then touching the same points in patient space. These points are generally anatomical landmarks that are easily identifiable on the patient. Second, lumen registration may be accomplished by generating a point cloud within the airways of patient 10 and matching the shape of the generated point cloud to an inspiration 3D airway model 410, an expiration 3D airway model 412, and/or a hybrid "Inspiration-Expiration" 3D airway model 414. Using four-dimensional tracking (4D) the point cloud may be generated at the appropriate respiration cycle to match inspiration 3D airway model 410, an expiration 3D airway model 412, and/or a hybrid "Inspiration-Expiration" 3D airway model 414. Generation of a point cloud is more fully described in U.S. Ser. No. 13/773,984, entitled "Systems, Methods and Devices for Forming Respiratory-Gated Point Cloud for Four Dimensional Soft Tissue Navigation," filed on Feb. 22, 2013, which is hereby incorporated by reference. Third, surface registration may involve the generation of a surface in patient 10 space by either selecting multiple points or scanning, and then accepting the best fit to that surface in image space by iteratively calculating with processor 72 until a surface match is identified. Fourth, repeat fixation devices entail repeatedly removing and replacing a device (i.e., dynamic reference frame, etc.) in known relation to patient 10 or image fiducials of patient 10. Fifth, two-dimensional (2D) image datasets may be registered to three-dimensional (3D) image datasets wherein, the two dimensional image datasets may include, but are not limited to, fluoroscopic images, ultrasound images, etc. and the three-dimensional (3D) image datasets may include, but are not limited, to computed tomography (CT) images, fused computed tomography-positron emission tomography (CT/PET) images, magnetic resonance imaging (MRI) images. Sixth, automatic registration may be accomplished by first attaching a dynamic reference frame to patient 10 prior to acquiring image data. It is envisioned that other known registration procedures are also within the scope of the present invention, such as that disclosed in U.S. Pat. No. 6,470,207, entitled Navigational Guidance via Computer-Assisted Fluoroscopic Imaging", filed on Mar. 23, 1999, which is hereby incorporated by reference.

Figure 13:
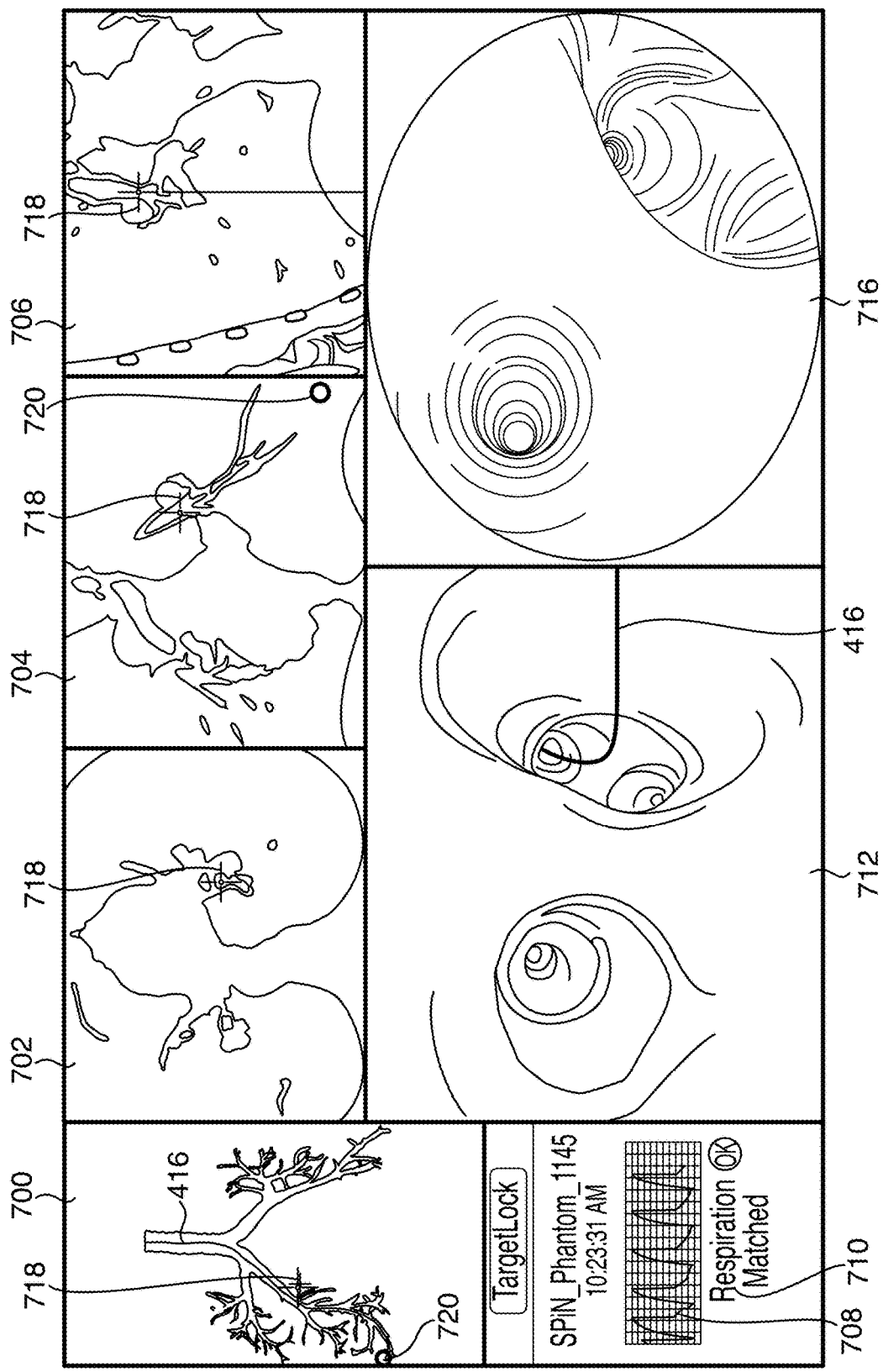
FIG. 13 illustrates a population of images which may be displayed on a display of a navigation system according to an embodiment of the invention.

After image dataset 400 is registered to patient 10, navigation system 70 displays on display 80 a variety of images as illustrated in FIG. 13. For example, as shown in panel 700, hybrid "Inspiration-Expiration" 3D airway model 414 may be displayed. Additionally, as shown in panel 700, an indicia 718 (shown as a crosshair) of the location of steerable catheter 600 is displayed. In certain embodiments, for example, indicia 718 indicates the location of distal end portion 606 of steerable catheter 600. In other embodiments, for example, indicia 718 indicates the location of localization element 610 of steerable catheter 600. In yet other embodiments, for example, indicia 718 indicates the location of tip 607 of steerable catheter 600. That is, navigation system 70 may be able to display an indicia indicating the location of a portion of steerable catheter 600 based on the tracked location of localization element 610. For example, if localization element 610 is disposed 5 mm from tip 607 of steerable catheter 600, the 5 mm distance may be taken into account by navigation system 70 and the indicia of tip 607 indicating the location of tip 607 may be displayed and not the location of localization element 610. An indicia 720 (shown as a circle) of an initial target tissue location may also be displayed on display 80 by navigation system 70 as shown in panel 700. Indicia 718, 720 are shown as a crosshair and circle, respectively; however it is envisioned that other indicia may be used to indicate the location of steerable catheter 600, initial target tissue location, confirmed target tissue location, location of a percutaneous needle, and/or any other target tissue or medical device. For example, indicia may have different shapes, colors, sizes, line weights and/or styles, etc. without departing from the scope of the invention.

Furthermore, navigation system 70 may be able to simulate and display axial, coronal and oblique images based on the position and orientation (POSE) of localization element 610 of steerable catheter 600, as shown in panels 702, 704, and 706. To simulate these views, navigation system 70 may modify one or more images from image dataset 400 using known image manipulation techniques. Additionally, navigation system 70 may simulate and/or display orthogonal image slices, oblique or off-axis image slices, volume rendered images, segmented images, fused modality images, maximum intensity projection (MIPS) images, video, and video enhanced images. As shown, indicia of 718 of steerable catheter 600 and/or an indicia 720 of an initial target tissue location may also be displayed, as shown in panels 702, 704, and 706.

In various embodiments as shown in panel 712, navigation system 70 also simulates a virtual volumetric scene within the body of patient 10, such as the airways of patient 10, from a point of view of a medical device, such as steerable catheter 600, as it is being navigated into and/or through patient 10. This virtual volumetric scene is a computer-generated visualization of a bronchoscopy procedure and simulates what would be viewed by a bronchoscopic video camera inserted into the airways. To simulate the virtual volumetric scene, navigation system 70 modifies one or more images from image dataset 400 using known image manipulation techniques. For example, navigation system 70 may be able to simulate the virtual volumetric scene using inspiration 3D airway model 410, expiration 3D airway model 412, and/or hybrid "Inspiration-Expiration" 3D airway model 414. Accordingly navigation system 70 renders an internal view of 3D airway model(s) 410, 412, and/or 414 based on a virtual bronchoscope video camera position, for example, by applying certain surface properties (e.g., Lambertian), diffuse shading model(s), and perspective projection camera model(s). Virtual lighting and shading may be applied to the rendered view to further enhance the virtual volumetric scene. The field of view (FOY) may be changed to match the field of view of bronchoscopic video camera 630 (see FIG. 12A). The point of view may be adjusted to match bronchoscopic video camera 630 or to display a virtual volumetric scene from different points along the airway or outside the airway. Navigation system 70 may also be able to display a navigation pathway 416 in the virtual volumetric scene. Accordingly, the virtual volumetric scene may allow a physician or other healthcare professional to review the navigation pathway 416 prior to inserting steerable catheter 600 and/or other medical device into patient 10. Additionally, in certain embodiments, an indicia of the location of localization element 610 of steerable catheter 600 and/or an indicia of an initial target tissue location may also be displayed.

Additionally, in various embodiments as shown in panel 716, navigation system 70 also displays a real-time image feed from bronchoscopic video camera 630 inserted into working channel 608 of steerable catheter 600. The real-time image feed may be static images or moving video. The real-time image feed may assist the physician or other healthcare professional in navigating steerable catheter 600 to proximate the initial location of the target tissue. Thus by inserting bronchoscopic video camera 630 into working channel 608 of steerable catheter 600 (see FIG. 12A), steerable catheter 600 may be used like a typical steerable bronchoscope. Typical steerable bronchoscopes are used to visually inspect the airways of a patient and have a fixed bronchoscopic video camera in addition to one or more working channels. Typical steerable bronchoscopes may have steering actuators and steering mechanisms that permit them to be steered much like steerable catheter 600. Because the bronchoscopic video camera of a typical steerable bronchoscope is fixed during manufacture of the steerable bronchoscope, the "up" orientation of the image feed from the bronchoscopic video camera as displayed to the physician or other healthcare professional is aligned with the "up" direction of the steering actuator of the typical steerable bronchoscope. However, it may be desirable to use steerable catheter 600 which may have a smaller outside diameter than the typical steerable bronchoscope. The image feed from bronchoscopic video camera 630 inserted into the working channel of the steerable catheter 600 can be oriented and aligned with the physician's view, as shown and described in U.S. Ser. No. 15/290,822, the entirety of which is incorporated herein by reference. As further described in U.S. Ser. No. 15/290,822, the real-time image feed from the bronchoscopic video camera 630 can be registered to the steerable catheter 600 and displayed by the navigation system 70.

Returning to FIG. 13, navigation system 70 may also display a graphical representation 708 of the respiratory cycle of patient 10 monitored using PTD 20. In certain embodiments, one or more of the images and/or indicia displayed in panels 700, 702, 704, 706, 712 and 716 are displayed as a function of the monitored respiratory state. That is, images in image dataset 400 and/or generated from image dataset 400 are displayed on display 80 that depict the anatomy of patient 10 at the monitored respiratory state. For example, when the patient is at expiration as monitored by PTD 20, images of the anatomy of the patient depicting the anatomy at expiration are displayed. Accordingly, when the patient is at inspiration as monitored by PTD 20, images of the anatomy of patient 10 depicting the anatomy at inspiration are displayed. In other embodiments, one or more of the images displayed in panels 700, 702, 704, 706, 712 and 716 may not be displayed as a function of the monitored respiratory state. That is, images in image dataset 400 and/or generated from image dataset 400 are displayed on display 80 that depict the anatomy of patient 10 at one respiratory state. For example, when the patient is at expiration and inspiration as monitored by PTD 20, images of the anatomy of patient 10 depicting the anatomy at expiration are displayed. In embodiments where images are not displayed according to the monitored respiratory state, an indication 710 of whether the displayed images match the monitored respiratory state may be shown (e.g., "Respiration Matched", "Respiration out of Sync").

Additionally, the display of indicia of the locations of the target tissue and/or indicia of the location of various medical devices may be synchronized or gated with an anatomical function, such as the cardiac or respiratory cycle, of patient 10. That is, in certain embodiments, the indicia are displayed on display 80 as a function of the monitored respiratory state. In certain instances, the cardiac or respiratory cycle of patient 10 may cause the indicia to flutter or jitter within patient 10. In these instances, the indicia will likewise flutter or jitter on the image(s) displayed on display 80.

To eliminate the flutter of the indicia on the displayed image(s), the position and orientation (POSE) of localization elements 610, 660 is acquired at a repetitive point within each cycle of either the cardiac cycle or the respiratory cycle of patient 10. To synchronize the acquisition of position data for localization elements 610, 660, navigation system 70 may use a timing signal (e.g., respiratory phase signal) generated by PTD 20; however one skilled in the art will readily recognize other techniques for deriving a timing signal that correlate to at least one of the cardiac or respiratory cycle or other anatomical cycle of the patient.

As described above, the indicia indicate the location of steerable catheter 600 based on the location of localization element 610 tracked by navigation system 70 as steerable catheter is navigated by the physician or other healthcare profession on and/or within patient 10. Rather than display the indicia on a real-time basis, the display of the indicia may be periodically updated based on the timing signal from PTD 20. In various embodiments, PTD 20 may be connected to navigation system 70. Navigation system 70 may then track localization elements 610, 660 in response to a timing signal received from PTD 20. The position of the indicia may then be updated on display 80. It is readily understood that other techniques for synchronizing the display of an indicia based on the timing signal are within the scope of the present invention, thereby eliminating any flutter or jitter which may appear on the displayed image(s). It is also envisioned that a path (or projected path) of steerable catheter 600, a percutaneous needle, and/or other medical devices may also be illustrated on the displayed image(s). The location of a target in the lung of a patient can be confirmed endobronchially utilizing the devices, systems, and/or methods described herein and as set forth in U.S. Ser. No. 15/290,822, the entirety of which is incorporated herein by reference.

As described above, the processor 52 of the image analysis system 50 and/or the processor 72 of the navigation system 70 utilize image processing and segmentation techniques to identify components in an image, multiple images, or one or more image datasets (e.g., image datasets from different time periods). The segmentations are used during the navigation methods as described above.

Existing methods for segmentation of anatomical treelike structures (e.g., airways, pulmonary vasculature), vary in degree of accuracy and processing time. Spillage occurs when voxels in an image are denoted as part of the segmentation which should not be included. To avoid spillage, many segmentation methods conservatively assess portions of the segmentation where spillage likely occurred, especially several generations deep in the treelike structure, and err on the side of excluding those portions. As a result, many high generation branches on the periphery of the treelike structure fail to be included in the resulting segmentation. However, for many segmentation uses (e.g., in image-guided pulmonary biopsies or other procedures), it can be clinically detrimental to be missing high generation branches on the periphery of the treelike structure (e.g., airway tree) near a target area. The best route to navigate to the target area may include pathways along branches not included in the segmentation. If these high generation branches on the periphery of the treelike structure are not included in the segmentation, navigation systems cannot utilize those branches to plan the optimal path to the target area. Extended segmentation that includes as many high generation branches as possible will provide improved clinical yields and more effective procedures and navigation to target areas.

Referring to FIGS. 15-19, segmentation extension methods are shown and described. The segmentation extension methods according to the present disclosure can be used in conjunction with the image analysis system 50, the navigation system 70, and/or the tracked medical devices (e.g., steerable catheter 600) described above to enhance the segmentation of the image(s) or image dataset(s) (e.g., to increase the accuracy and optimize the navigated pathway 416 to reach target tissue 420, for example).

Figure 14:
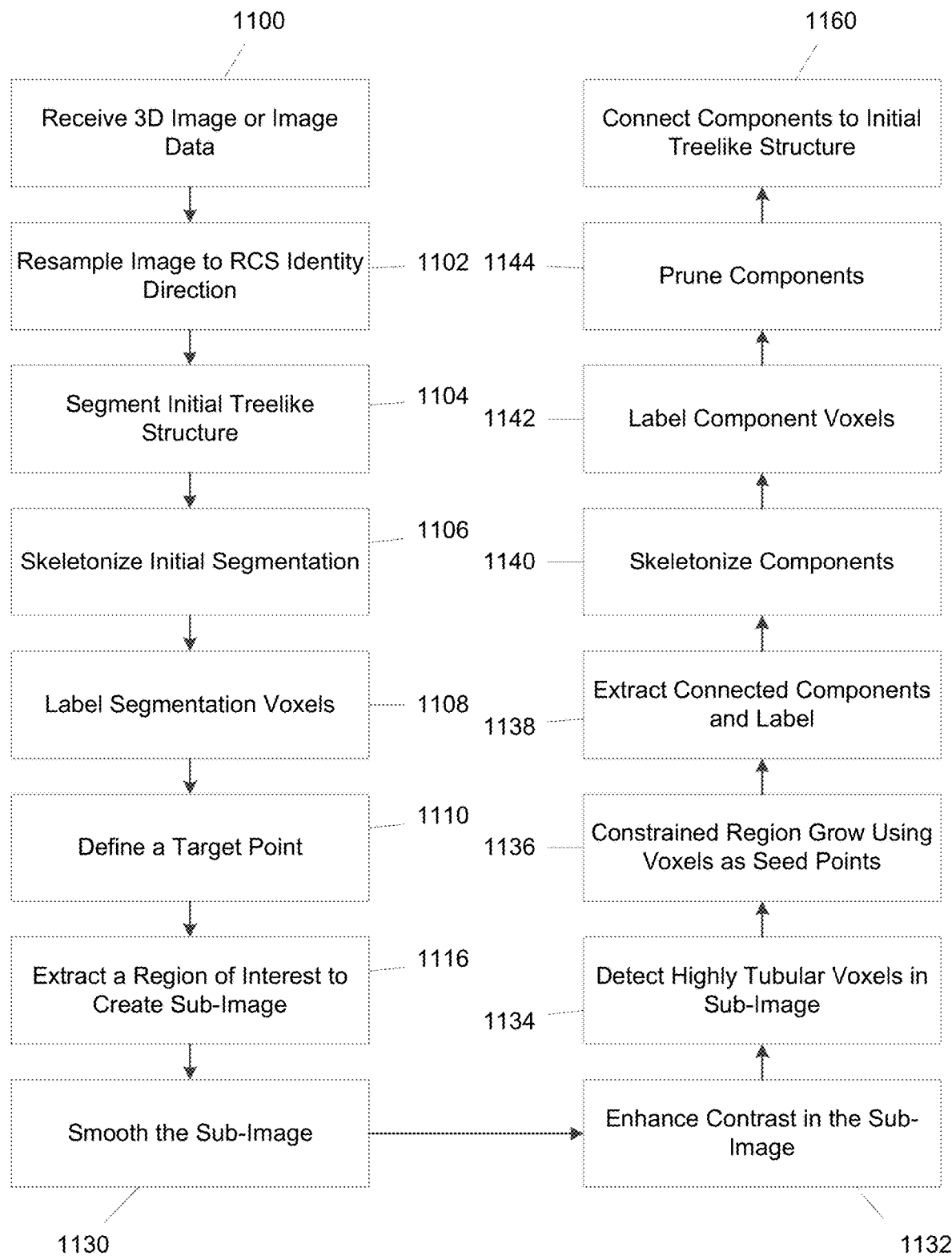
FIG. 14 is a flowchart illustrating a method of local extension for a segmentation according to an embodiment.
Figure 15:
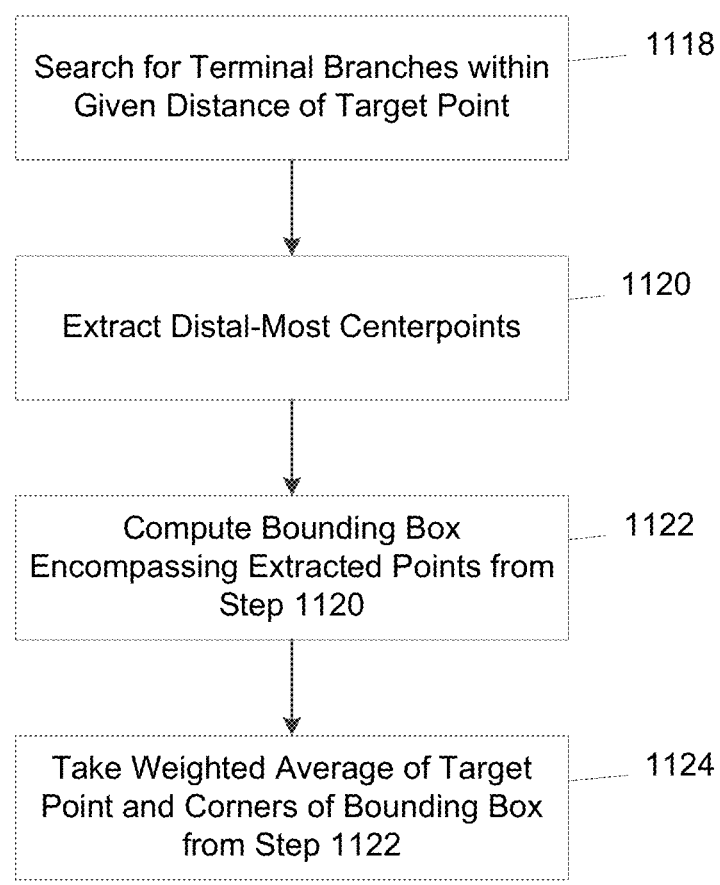
FIG. 15 is a flowchart illustrating a method of defining a region of interest according to an embodiment.

FIG. 14 illustrates a local extension method for segmentation of anatomical treelike structures according to an embodiment. First, an initial segmentation of the treelike structure is extracted from 3D image data (e.g., image(s), image dataset(s), etc.). At step 1100, 3D image data is received, for example loaded into a memory component from a disk or directly from an imaging device (e.g., imaging device 40 of the system described above). The 3D image data includes specified reference coordinates system (RCS) coordinates. In one embodiment, the 3D image data includes a high resolution CT scan. At step 1102, the 3D image data is resampled to the RCS identity direction. Step 1102 is optional to simplify subsequent steps of the method, and it is understood that resampling the image may be omitted within the scope of the present invention. For example, other steps in the disclosed method could account for non-identity directions if the image is not resampled to correspond to the identity matrix. At step 1104, the 3D image is segmented to obtain an initial segmentation of the anatomical treelike structure (e.g., airway tree, pulmonary vascular tree, etc.). Step 1104 can be performed using various segmentation techniques, such as Hounsfield unit thresholding, convolution, connected component, or other segmentation technique. For example, in one embodiment the initial segmentation is performed using a custom airway segmentation library or using a coarse segmentation that extracts the main branches of the treelike structure and the first few generations of branches.

After the initial segmentation is extracted, at step 1106 a centerline skeleton is created from the initial segmentation. The centerline skeleton is topologically treelike (i.e., n bifurcation points with n−1 centerlines connecting the bifurcation points). The centerline skeleton may include a number of "branches" (or edges) corresponding to an ordered list of 3D points (center points) that comprise a simple path with no loops or bifurcations. For example, a branch or edge may include several center points that are connected to form the edge. At step 1108, each voxel in the initial segmentation is assigned to an edge in the centerline skeleton (i.e., mask labeling each voxel by the "tree" edges). In this mask labeling step, each voxel is assigned to an edge such that the Euclidean distance between the corresponding geometric point of the voxel and the minimum distance to the centerline of the edge is minimized. Each edge will correspond to a generally cylindrical and convex mask containing the center points of the edge.

Referring still to FIG. 14, at step 1110, a target area or point (for example, a nodule on a lung, or target tissue 420 as described above) within the image space is defined. The target point is preferably within reasonable proximity to the treelike structure. The target point can be defined manually or automatically. In one embodiment, a user can select the target point using a graphical user interface, such as I/O component 78 of the navigation system 70. In another embodiment, the target point can be automatically defined based on segmentation techniques (e.g., Hounsfield unit thresholding). The defined target point identifies the location in image space for the segmentation extension to reach. In one embodiment, the defined target point is a nodule (e.g. a centroid of a segmented nodule from the initial segmentation). In this embodiment, a user may desire additional treelike structure information extending to the nodule, for example for navigation to the nodule for biopsy or treatment. In another embodiment, the target area or point is a volume of branch sparsity. In this embodiment, a user may desire to generally improve the segmentation of the treelike structure in an area where few or no branches were identified in the initial segmentation, without necessarily having a direct clinical application or need to reach the target point for a procedure. In other embodiments, the target point or area can be determined by navigational information, such as information from navigation system 70 obtained during a procedure, as described in detail elsewhere herein. In these embodiments, the navigational information is used to define and extract the region of interest as described below with reference to step 1116, without necessarily identifying an area or point for the extended segmentation to reach.

At step 1116, a region of interest for segmentation extension is extracted from the image. The region of interest is defined by a bounding box based on the location of the target point and/or nearby branches of the treelike structure. In one embodiment, a fixed-size bounding box (e.g., 1 cm cube; 2 cm cube; 3 cm cube; any suitable fixed size) is centered at the target point to define the region of interest. In a clinical application it is likely less helpful for the target point to be centered in the region of interest, as branches beyond the target point are not helpful for navigating to the target point. In another embodiment, the bounding box can be sized and positioned to encompass all center points within a given distance (e.g., 1 cm, 2 cm, 3 cm, any suitable distance) of the target point. In another embodiment, a hybrid approach is used to define the bounding box, combining both the location of the target point and the location of nearby branches. For example, a bounding box can be defined to encompass all center points within a given distance of the target point, and then extended towards the target point. In one embodiment, illustrated in FIG. 15, a hybrid approach to defining a region of interest includes searching for at most max and at least min terminal branches within a given distance of the target point (step 1118). At step 1120, a percentage of the distal-most center points from the terminal branches are extracted. For example, in one embodiment, at step 1120 the distal 30% of center points from the terminal branches are extracted. At step 1122, a bounding box encompassing the extracted points from step 1122 is computed, and at step 1124 a weighted average of the target point and corners of the bounding box is taken based on where the target point is in relation to the box. The faces of the bounding box are extended toward the target point as necessary based on the weighted average.

Referring again to FIG. 14, at step 1130, the sub-image (i.e., the extracted region of interest) is smoothed. Smoothing the sub-image can help improve the accuracy of subsequent steps (e.g., tubular structure point detection). However, too much smoothing can have a detrimental effect in that points within the desired treelike structures will not be detected. In one embodiment, bilateral smoothing can be used to smooth the sub-image. Bilateral smoothing includes performing Gaussian smoothing while maintaining edges of the structures in the sub-image, which is beneficial for airway segmentations because it smooths without losing the details of lumen walls. Alternatively, ordinary Gaussian smoothing can be used. This smoothing step is optional, and may be omitted within the scope of the present invention.

At step 1132, the contrast of the sub-image is enhanced. Enhancing the contrast of the sub-image amplifies the first and second derivatives of the sub-image, which improves the accuracy of and reduces the processing time for subsequent steps. The derivatives of the sub-image can be approximated at a voxel using a value (e.g. Hounsfield unit) at the voxel and the values at voxels in a neighborhood of the voxel. Amplifying contrast leaves the derivative values unaffected in regions of the image where the voxel values are uniform and accentuates the derivative values in regions with varying voxel values. In one embodiment, adaptive histogram equalization is used to enhance the contrast, although any contrast enhancement can be used. This enhancing contrast step is optional, and may be omitted within the scope of the present invention.

At step 1134, voxels corresponding to tubular structures in the sub-image are detected. For example, voxels corresponding to tubular structures in the sub-image having voxel values sharing qualities (e.g., trajectory or range of trajectory, Hounsfield density within a certain range (e.g., lower for lumens and higher for vasculature), etc.) with voxels in the initial segmentation are detected. In this step, objects of certain dimensionality (e.g., 1-dimensional line/tube structures) are extracted from the image based on a multi-scale Hessian analysis of the sub-image. The eigenvalues and eigenvectors of the Hessian analysis, computed discretely at different scales, are computed for each voxel. This information is used to assign each voxel a metric value based on how tubular the voxel is. In one embodiment, the metric value is derived from a weighted function incorporating the eigenvalues of the Hessian analysis. In another embodiment, the span of the eigenvectors corresponding to the two larger magnitude eigenvectors of the Hessian analysis (the tubular structure's cross-section plane) is used to create a gradient vector flow vector field, which is then used to assign a metric value. Alternatively, a metric value can be obtained via a circle fitting method using the gradient vector flow vector field. The analysis can be used to detect either relatively dark (e.g., airway lumens) or relatively bright (e.g., vasculature) tubular structures. Once each voxel in the sub-image is assigned a metric value, thresholding is used to extract only voxels with a "good" or desired metric value (i.e., voxels satisfying a metric value criterion). For example, in one embodiment, thresholding is used to extract only voxels having a metric value at least half the maximum metric value in the sub-image. An imaging processing library can be used to compute the Hessian image analysis and to evaluate the metric for each voxel.

Next, connected components are extracted from the thresholding result. For each component, the following information is extracted: the voxel with the highest metric value, the physical point corresponding to this voxel, the voxel value at this voxel, the minimum and maximum voxel value within the component, the tube direction (which corresponds to the eigenvector for the smallest eigenvalue of the Hessian analysis at the voxel), and the number of voxels in the component. In the case of airway lumens, the tube direction is used to estimate the radius of the tube by casting rays from the point in a circle that is perpendicular to the tube direction. The stopping condition for the ray is determined by a change in voxel value above a certain threshold. In one embodiment, the percentage of "lumen wall hits" that occur before a maximum traversal stopping condition can also be recorded. For example, if intensity values along the ray increase beyond a certain threshold (e.g., 100 HU) given a certain step size (e.g., 0.2 mm), it is considered a "lumen wall hit." It is expected that low intensity tubular structures encased by higher intensity hollow tubes (lumen walls) will have a high percentage of such "lumen wall hits." The information gathered for each component is used to discard likely false positives and to pass information on to subsequent steps of the extension method. Additional information can be extracted for each component. For example, in one embodiment, proximity to plate-like structures can be extracted for airway lumens. The information that is extracted can be used as a feature vector, and machine learning techniques can be employed to discard more false positives at this step 1134, although this is not required within the scope of the present invention.

As step 1136, the voxels detected in step 1134 are used as seed points for spillage-constrained region growing. Each seed point that was located in step 1134 is used for region growing. In one embodiment, the region growing method only grows voxels in a range that is the same as those produced in the initial treelike segmentation. In one embodiment, the region growing method analyzes the growth after a certain number of iterations to determine whether or not to stop based on the likelihood of spillage. For example, the region growing method can include a cutoff for the maximum allowable percent growth, or other spillage-constraining mechanism. In one embodiment, the region growing method includes an analysis after a certain number of iterations to skeletonize and analyze the shape of the growth (e.g., the elongation, the eccentricity, etc.) to determine the likelihood of spillage.

At step 1138, each resulting connected component based on the growth in step 1136 is extracted and labeled. The method can include thresholding values to avoid spillage. For example, in one embodiment, components with less than a certain number of voxels (e.g., less than 20 voxels) are discarded.

Referring still to FIG. 14, at step 1140 a centerline skeletonization of each extracted component that is topologically treelike is created. This step is like step 1106 described above, but performed on the extracted connected components from step 1138. At step 1142, each voxel in the extracted connected components is assigned to an edge in the centerline skeleton (i.e., mask labeling each voxel by the "tree" edges, as described above with reference to step 1108).

Figure 16:
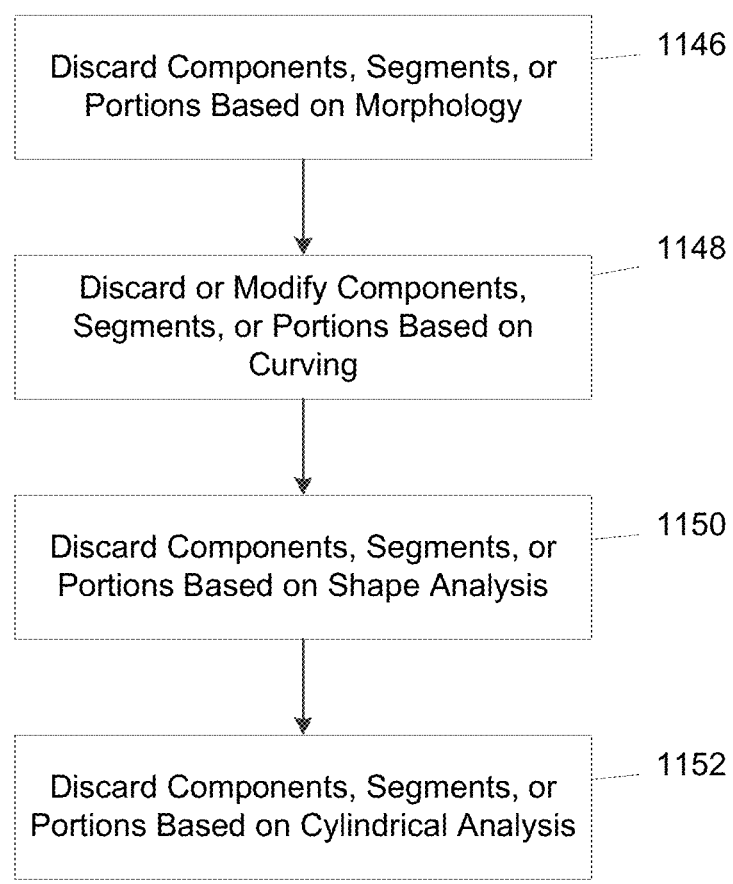
FIG. 16 is a flowchart illustrating a method of pruning extracted components according to an embodiment.

At step 1144, the extracted connected components are pruned to remove components likely to be false positives. Entire components, segments within components, or portions of segments within components can be discarded based on image processing and/or geometric criteria in this pruning step. As shown in FIG. 16, the pruning step 1144 includes the application of a variety of image processing and geometric constraints to determine if a structure can be characterized as a sub-tree of the initial treelike structure. The pruning method is based on certain assumptions about the characteristics of a valid component, segment, or portion (i.e., a component, segment, or portion that is a sub-tree of the initial treelike structure). It is assumed that valid components and their sub-segments should have genus zero (no holes) and be relatively convex, especially for segments. The pruning method analyzes these characteristics based on a metric that takes the ratio of the component or segment volume before morphological closing to its volume after morphological closing. Valid structures should score high on this morphology metric. After morphologically closing, the volume will be greater than or equal to the volume before morphological closing, so the ratio will be in the range of 0 to 1. The expected shapes for valid structures should have volumes that are roughly the same and relatively invariant before and after morphological closing (e.g., ratio of before to after morphological closing of about 0.925 or greater with a structuring radius of 1 for full components, or a dynamically defined ratio with a larger structuring radius for segments of a component). Based on this assumption, at step 1146 the pruning includes discarding components, segments, or portions based on the morphology metric. It is assumed that valid segments should not curve too much. The pruning method analyzes this characteristic by computing the dot product of the local segment direction (a small center point look-ahead), starting at its terminal end, and a more global direction (a larger look-ahead, e.g., to more center points). At step 1148, if this calculated curving value is below a certain threshold, the segment is trimmed. It is assumed that valid segments should have appropriate numerical values for certain shape analysis metrics, including minor axis length (derived from the principal component analysis), elongation, and eccentricity. In one embodiment, these shape analysis values can be taken from an image processing library. At step 1150, components/segments/portions are discarded if the shape analysis values are not appropriate. For example, in one embodiment a minor axis length of less than about 0.5 would trigger pruning or discarding of the segment, component, or portion. In one embodiment, an elongation of less than about 2.0 would trigger pruning or discarding of the segment, component, or portion. In one embodiment, an eccentricity of less than about 0.8 would trigger pruning or discarding of the segment, component, or portion. It is understood that other shape analysis values can be applied in this pruning step, and that the condition metrics can be dynamic. It is assumed that for valid segments, each contiguous sub-segment of at least a given length should have about the same circle equivalent diameter (the diameter of a cylinder which has the same length and volume as this segment, given the length of its center point path). In one embodiment, a cylindrical score is based on the difference between the average of the three largest sub-segment circle equivalent diameters and the average of the three smallest sub-segment circle equivalent diameters. Taking the average accounts for noise. At step 1152, components, segments, and/or portions are discarded based on this cylindrical score. For example, in one embodiment a cylindrical score metric (based on the difference between the average of the greatest few and least few diameters as described) greater than about 1 mm would trigger pruning or discarding of the segment, component, or portion. The pruning steps shown in FIG. 16 are performed iteratively on a component until it is invariant for an entire iteration. In other words, the pruning steps are performed iteratively until the component is not pruned or modified at all between consecutive iterations. After each iteration, if the component is modified (e.g., if some curving is removed thereby modifying the component/segment/portion), the skeletonization and mask labeling of steps 1140 and 1142 are recomputed for the component. In one embodiment, the characterization of valid subtrees and resultant pruning is enhanced by machine learning techniques, although this is optional. It is understood that additional pruning criteria can be employed to discard or modify potential components. For example, pre-defined shape models can be utilized to determine if potential components/segments/portions fit expected or common airway structures. Bifurcation models (e.g., 2 or 3 branch shapes) can be used to determine if the potential component points fit high probability shapes for tree structures. The bifurcation models can be modified based on prior found airway branches to appropriate diameters, sizes, and configurations, based on location within the tree structure.

Figure 17:
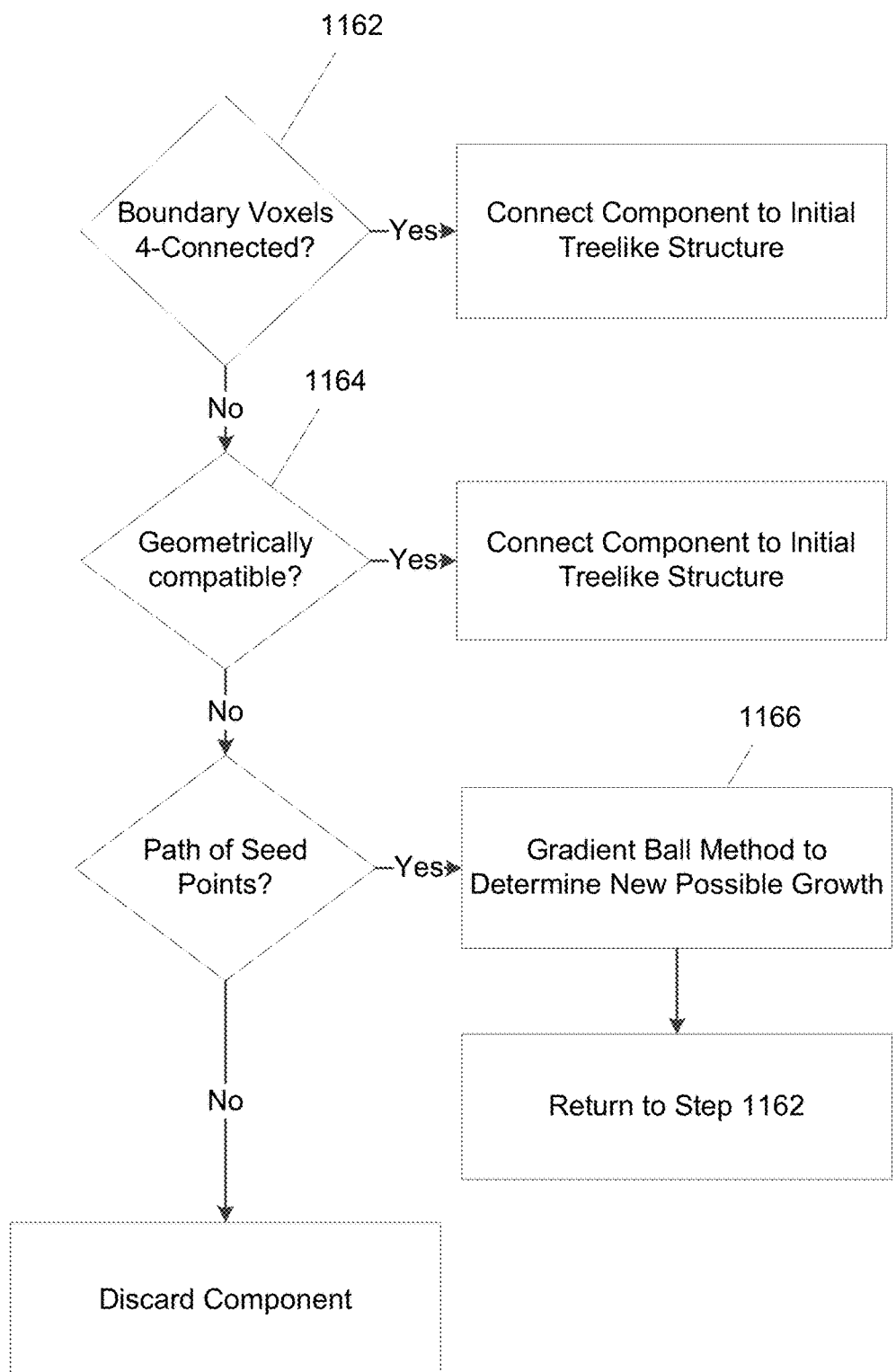
FIG. 17 is a flowchart illustrating a method of connecting components to an initial treelike structure according to an embodiment.

At step 1160, the components that are determined to be valid after the pruning at step 1144 are connected back to the initial treelike structure. The pruned components are connected back to the initial treelike structure based on image processing and/or geometric criteria. Referring to FIG. 17, at step 1162 it is determined whether the component has boundary voxels that are 4-connected to the initial segmentation. If so, voxels are filled in to fully connect the component to the initial segmentation. If not, at step 1164 it is determined whether the component is geometrically compatible with the initial segmentation. For each segment in the component, all terminal segments of the initial treelike structure within a certain distance, based on the 3D Euclidean distance between center points, of the component segment are collected from the initial treelike structure. For example, in one embodiment all terminal segments of the initial treelike structure having center points that are within about 2 cm to about 4 cm, based on the 3D Euclidean distance, of center points in the segment of the component are collected. For instance, in one embodiment terminal segments of the initial treelike structure are collected starting at a first distance (e.g., 2 cm) and continuing at greater distances within a range until a sufficient number of terminal segments are found. The radius of each terminal segment is estimated at the terminal end, using a technique similar to the one described above with reference to step 1134. Then, a radius estimate for the current segment is calculated. If 1) the radii are compatible, 2) the terminal point of the terminal segment is within a certain distance of the proximal point of the component's segment, and 3) the dot product of the segment's directions and the dot products of the directions with the vector from the distal end of the terminal segment to the proximal point of the component's segment are compatible (e.g., close to 1), then voxels are filled in connecting the component to the initial segmentation. If both step 1162 and step 1164 fail, but the segment of the component under consideration contains a "path" of seed points determined using the points and Hessian directions from step 1134, the probability of the component being valid is assumed to be high. In this case, some of the constraints of step 1164 are relaxed. If, upon relaxing the constraints of step 1164, the constraints are compatible, a "gradient ball" method is employed at step 1166 to determine new possible growth. First, starting at the component segment's proximal point, a ball with a radius determined by the segment's estimated radius is centered at the point. Second, the voxel with the maximum or minimum voxel value (e.g., based on whether the structure is a vasculature or lumen structure) in the ball that is above or below a certain threshold and that falls within a cylinder of radius determined by both the segments' radius estimates connecting the two segments (component segment and terminal segment of initial treelike structure) is found. For example, for lumen structures, the voxel with the minimum voxel value in the ball that is below a threshold (e.g., below −700 HU in one embodiment) and falls within a cylinder connecting the component segment to the terminal segment of the initial treelike structure is found. If there is no voxel below the threshold condition, this sub-method stops because there are no voxels satisfying the condition. For vasculature structures, the voxel with the maximum voxel value in the ball that is above a threshold and falls within a cylinder connecting the component segment to the terminal segment of the initial treelike structure is found. If there is no voxel above the threshold condition, this sub-method stops because there are no voxels satisfying the condition. Third, voxels are filled in connecting the new voxel to the component segment that are within a specified range of voxel values (e.g., above or below the threshold value as described above). These three steps are repeated until there is no voxel in the ball satisfying the condition. In other words, an iterative constrained walk from the component segment to the terminal segment of the initial treelike structure is performed until no voxels satisfy the conditions. The segment connection is then attempted again, given this new possible growth. Other methods for connecting disconnected segments back to the initial segmentation are within the scope of the present invention.

The local extension method as shown and described can be used in image-guided surgery and navigation, such as described above. For example, the method can be used with the imaging, tracking, localization, and navigation systems and methods described in U.S. Ser. Nos. 13/817,730 and 15/290,822, the entireties of which are incorporated herein by reference. The local extension method described above can be implemented on a computer using computer processors, memory units, storage devices, computer software, and other components. For example, in one embodiment the local extension method is implemented on the navigation system 70 (see FIG. 3), such as by processor 72. In certain embodiments, navigation system 70 further includes and/or is in data communication with the imaging device 40, and the method includes obtaining an image(s) from the image device and performing the segmentation methods on the image(s). The segmentation methods described herein can be applied to one or more images from an image dataset, for example the image datasets as described above. The segmentation methods can be performed on one or more images before or after the construction of a fused inspiration-to-expiration model for use in navigation.

Figure 18:
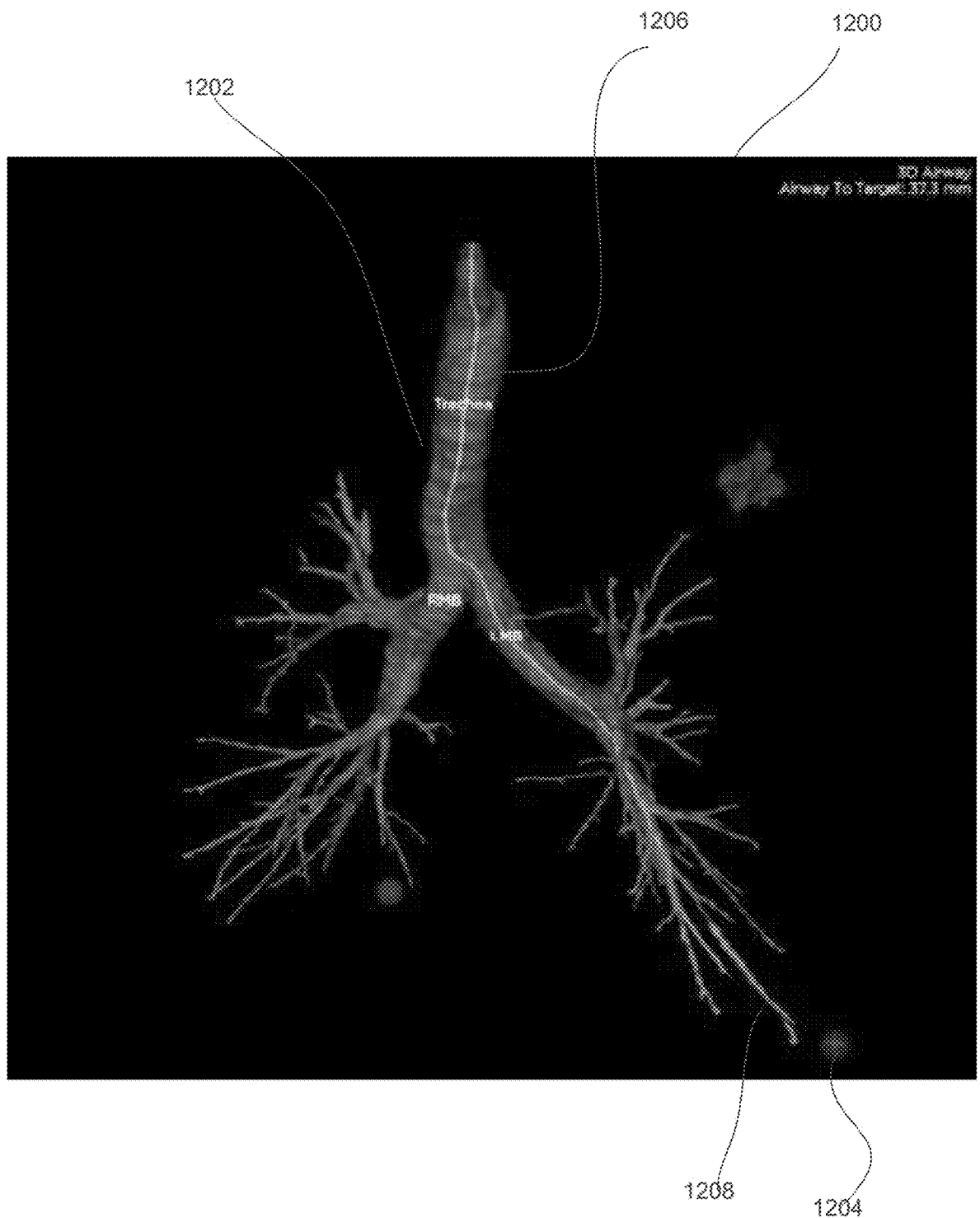
FIG. 18 is an image for navigating to a target, illustrating an initial path to a target based on an initial segmentation.
Figure 19:
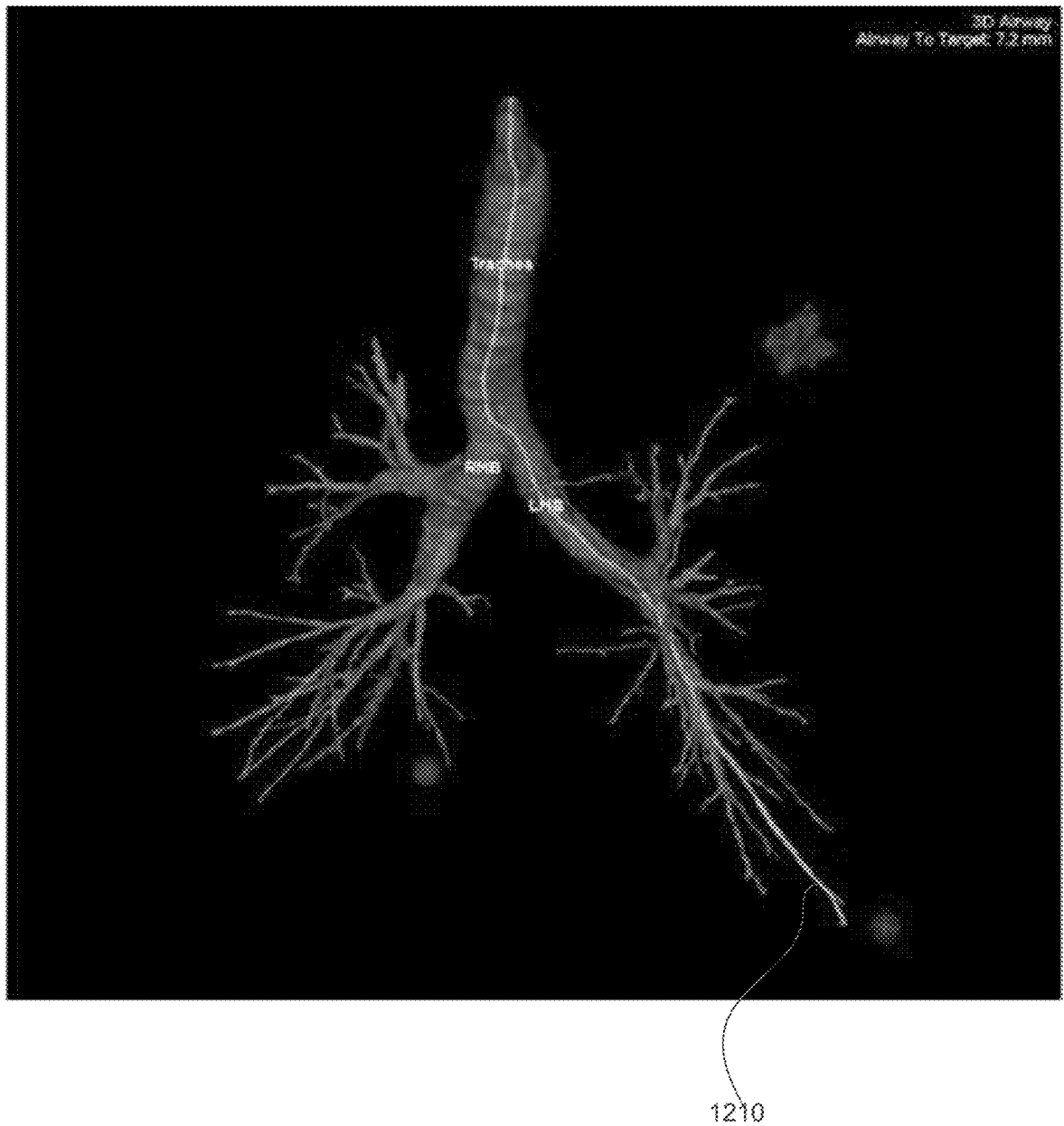
FIG. 19 is an image for navigating to a target, illustrating a revised path to a target based on an extended segmentation.

In one embodiment, the method is used to locally extend a segmentation in a region of interest to navigate to a nodule or target in an airway tree using the navigation system 70. For example, FIG. 18 illustrates an initial segmentation 1200 of an airway tree. The initial segmentation 1200 includes the initial treelike structure 1202 and a nodule or target 1204 (such as the target tissue 420 described above). In order to access the target 1204, the navigation system 70 can determine the pathway 1206 (e.g., an initial navigation pathway such as pathway 416 described above) through the airway tree to reach the target. After a region of interest is identified (e.g., automatically or manually based on user input such as through I/O component 78) and the disclosed extension method is performed on the initial segmentation 1200, new sub-tree components 1208 are identified and connected back to the initial treelike structure 1202. Based on these new components, the navigation pathway to the target 1204 is changed, because the local extension method found airways offering a more direct or shorter pathway 1210 to the target (see FIG. 19).

In some embodiments, additional information collected during navigation can be used to enhance the segmentation extension methods described herein. For example, as described above with reference to step 1100, image data (e.g., 3D image data such as data from CT image(s)) is received, and at step 1106, the image data is segmented to create an initial segmentation. During a navigated procedure, such as those described above, extension of the segmentation can be enhanced using at least one of navigation data and navigated image data. Navigation data includes data from a 3D localizer or localization element using an EM sensor (e.g., data from a device or instrument tracked by navigation system 70, as described in detail above). The navigation data includes point(s) or a point cloud, such as points corresponding to a traveled path of the navigated device or instrument, the current location of the navigated device or instrument, and/or a projected trajectory of the navigated device or instrument. Navigated image data includes 2D or 3D data from a navigated imaging device (e.g., navigated ultrasound). The navigated image data includes 2D or 3D image data (e.g., image(s), image dataset(s)). Points or a point cloud can be identified in the navigated image data. The segmentation methods disclosed herein utilize the different sources of information as parameters to determine if the point(s) or point cloud from navigation data and navigated image data should be added to the initial segmentation of the airway structure (such as by modifying the pruning constraints), as described in further detail below.

In one embodiment, the target area for use in extracting the region of interest for extension of the segmentation can be defined using the registered location of a localized medical device tracked by the navigation system 70 (e.g., steerable catheter 600 or other navigated medical device). After the initial segmentation is performed and the navigated pathway 416 or 1206 is determined, an instrument tracked by the navigation system 70 is inserted into the airway and navigated to a location in the airway. The position of the localized instrument is registered to image space, and can be displayed by the navigation system 70 as described above. Based on this registered location, a region of interest can be defined to extend the initial segmentation as described with reference to FIGS. 14-19. For example, a user can manually initiate an extension of the segmentation based on the current location of the navigated instrument. Alternatively, the extension of the initial segmentation can be automatically initiated, for example based on the instrument approaching a terminal segment of the initial segmented airway, based on the instrument being positioned in a terminal segment of the initial segmented airway for a number of consecutive frames, or based on any other indication that the currently navigated region is of clinical interest. The region of interest can be centered around the navigated instrument (e.g., the tip of the navigated instrument), or can be weighted to extend toward a target area or tissue. In this embodiment, there is no dependence on a target tissue or nodule; rather, the region of interest or target area is identified based on the position of a localized instrument. In one embodiment, the segmentation extension methods can be used during a procedure to define a likelihood that an airway is in front of a navigated instrument. For example, the current trajectory of a navigated instrument can be used at the end of an initially segmented airway to define a region of interest, and the methods of FIGS. 14-19 performed to determine if it is likely that airway structure extends beyond the initial segmentation. Thus, a pathway of airway structure can be "built" in front of the navigated instrument as a procedure is performed.

In another embodiment, the region of interest for the disclosed extension methods can be defined by a path traveled by a navigated instrument. In this embodiment, the segmentation can be extended as disclosed to give a better representation to the user of a localized instrument within an airway. For example, a localized medical device (e.g., steerable catheter 600) tracked by navigation system 70 is navigated through the airway. If the registered location of the localized instrument does not correspond to a part of the initial airway segmentation, the navigated path to the registered location can be used to define the region of interest for segmentation extension. If the path to the current registered location (e.g., a point cloud defined by the navigated device) of the localized instrument defines a line or shape of points that match within acceptable criteria, that traveled path or point cloud is used to define the region of interest for segmentation extension. The criteria can include, for example, distance from the line or shape of points of the traveled path to centerlines of the initial segmentation, compatibility of shape and trajectories of the traveled path (given by, e.g., principal component analysis) and trajectories of segments in the initial segmentation, and/or distance from the traveled path to a terminal segment of initial segmented airway. If the line or shape of points from the traveled path of the navigated instrument matches the initial segmentation as determined by the criteria, a bounding box of the points in the traveled path can be used to define the region of interest for the segmentation extension method.

In one embodiment, a traveled path or point cloud generated by a navigated instrument (e.g., steerable catheter 600 tracked by navigation system 70), or a projected trajectory of the navigated instrument, can be used as a metric or weighted parameter for the pruning step 1144 described above. For example, segments/components/portions from the region growing results can be discarded or kept at step 1144 based on whether they are compatible with the traveled path or point cloud of a navigated instrument. In one embodiment, if the registered positions and/or trajectories of the localized instrument match geometrically to a possible component, but the pruning constraints of steps 1146-1152 would otherwise discard the component, the pruning constraints can be relaxed based on the geometric compatibility of the possible component with the navigated points and trajectories of the localized instrument. Similarly, a traveled path or point cloud generated by a navigated instrument can be used to connect components at step 1160.

In one embodiment, the traveled path or point cloud generated by a navigated instrument can be used to determine seed voxels for the constrained region growing at step 1136. For example, in this embodiment the detection of highly tubular voxels (e.g., via Hessian analysis) at step 1134 can be omitted if the navigated instrument creates a point cloud on a number of consecutive frames that is similar to a narrow cylinder. The centroid of the navigated points can be determined and used as a seed point for the region growing at step 1136. Alternatively, in one embodiment the centroid of the convex hull is determined and used as a seed point for the region growing at step 1136. The convex hull is the smallest polyhedron that contains all of the navigated points. In one embodiment, for example, the centroid of the vertices of the convex hull, which ideally will be a point inside the airway, can be used as a seed point for the region growing step 1136. Other uses for the additional information obtained during navigation are within the scope of the present invention.

In one embodiment, the segmentation extension methods as described above can be performed for one or more regions of interest in a pre-processing step. Potential components that are discarded or pruned can be identified in this pre-processing step. During navigation in a procedure, the potential points that were discarded or pruned can be added to the airway if additional navigation information (e.g., based on location and/or trajectories of a navigated instrument) indicates the points are valid candidates. For example, in one embodiment, an initial segmentation is performed on image data from inspiration, as described above. A target or region of interest can be identified on the inspiration image data, and the segmentation extension methods described herein performed to extend the segmentation to the target or in the region of interest. During the segmentation extension, as described elsewhere herein, certain components, segments, or portions are discarded during the pruning step based on the criteria analysis. The segmented inspiration image data is then deformed to form the inspiration-expiration fused model for navigation. During this pre-processing step, including the segmentation extension, the information regarding the data points that were pruned during the segmentation extension is maintained (e.g., stored in the memory of the image analysis system and/or the navigation system; stored in external memory; stored with the image data, etc.). During navigation, additional information regarding the treelike structure is obtained based on the localized position of the navigated instrument and/or additional image data collected during the procedure. This additional information can be used to enhance the previous segmentation. For example, certain components may have been pruned or discarded initially, but based on the additional navigation information those components are more likely to be valid. The pruning step can be performed again, using the additional navigation information to the original information analyzed in the first pruning. As a result, an enhanced segmentation is obtained with additional valid components now identified.

As described above, two-dimensional (2D) image datasets may be registered to three-dimensional (3D) image datasets wherein, the two dimensional image datasets may include, but are not limited to, fluoroscopic images, ultrasound images, etc. and the three-dimensional (3D) image datasets may include, but are not limited, to computed tomography (CT) images, fused computed tomography-positron emission tomography (CT/PET) images, magnetic resonance imaging (MRI) images. In one embodiment, point(s) or a point cloud can be obtained from one or more 2D images during navigation, and those points can be used to enhance the segmentation extension methods described herein. For example, a navigated imaging device (e.g., ultrasound) can be used during a procedure. The imaging device can be an independent navigated device (e.g., including a localization element tracked by the navigation system) that is inserted into the airway, or alternatively can be an imaging device inserted into the working channel of the steerable catheter (with either or both of the imaging device and the steerable catheter including localization elements tracked by the navigation system). During navigation of the navigated imaging device, additional information is collected. For example, as described above, the traveled path of a navigation instrument provides data that can be used to connect candidate components or to enhance the image segmentation. In addition, during navigation the system can acquire a point cloud from 2D images from the imaging device. These points can be used to extend the segmentation in areas other than along the navigated path of the imaging device, or to inform the likelihood that certain candidate components, segments, or portions are valid subtrees. For example, certain candidate components that were previously discarded may subsequently be displayed by the navigation system based on additional information gained during navigation (e.g., from a navigated instrument (location and/or trajectory), from imaging data from a navigated imaging device, etc.).

Figure 20:
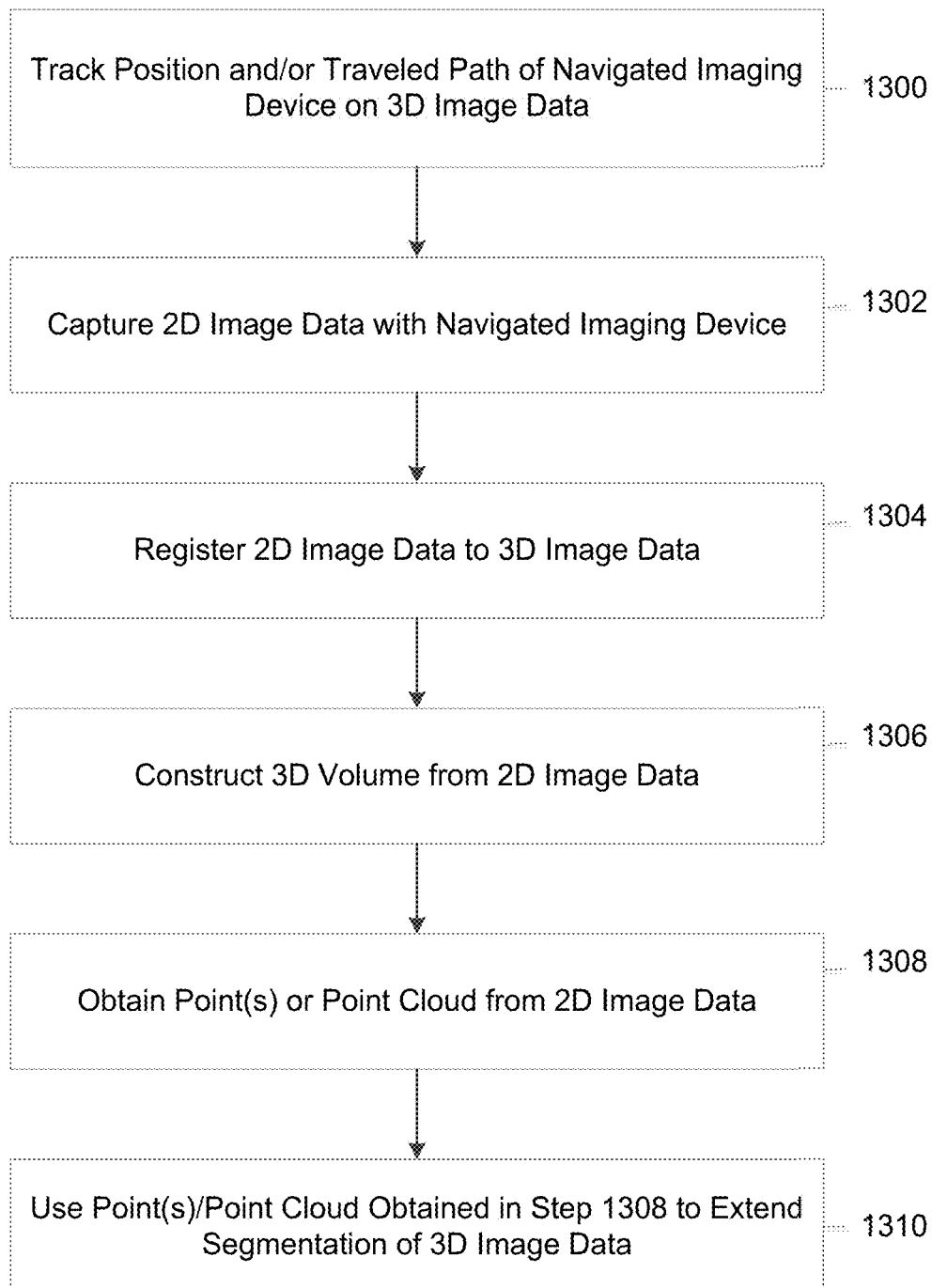
FIG. 20 is a flowchart illustrating a method of using 2D image data to extend a segmentation according to an embodiment.

Referring to FIG. 20, in one embodiment 2D image data captured during a procedure is used to enhance the segmentation extension methods disclosed herein. At step 1300, the position and/or traveled path of a navigated imaging device is tracked. For example, the navigated imaging device can comprise an independent navigated device, or an imaging device inserted into the working channel of the steerable catheter, as described above. The position and/or traveled path of the navigated imaging device is tracked by the navigation system 70. The location of the tracked imaging device can be displayed, such as by indicia on the 3D image data as described above. The 3D image data can comprise an initial segmentation (such as the initial segmentation discussed above at step 1104). The 3D image data can comprise an extension of the initial segmentation (such as described above at step 1160, wherein valid components are connected to the initial segmentation). The location of the navigated imaging device is tracked on the 3D image data. At step 1302, 2D image data is captured by the navigated imaging device. For example, one or more 2D images can be captured by the navigated imaging device as it is advanced through an airway. The 2D image(s) can include image data regarding the airway in which the navigated imaging device is located, and/or data regarding airways adjacent to the location of the navigated imaging device. The 2D image data is collected, for example, during a procedure. In one embodiment, the 2D image data comprises 2D ultrasound image(s) obtained during a procedure. Multiple 2D images can be acquired during the procedure. At step 1304, the 2D image data is registered to the 3D image data on which the imaging device is being navigated. For example, 2D ultrasound image data can be registered to 3D CT image data. At step 1306, a 3D volume is constructed from the 2D image data gathered during the procedure at step 1302. Step 1306 is optional, and it is understood that it can be omitted within the scope of the present invention. At step 1308, point(s) or a point cloud is obtained from the 2D image data (e.g., from the 2D image(s) and/or from a 3D volume constructed from the 2D image(s)). The point(s) or point cloud can be obtained manually or automatically. For example, in one embodiment a user can manually select (e.g., using I/O component 78 to select point(s)). In another embodiment, the point(s) can be obtained automatically, such as by segmentation (e.g., segmentation of a 3D constructed volume from step 1306; segmentation of 2D image data from step 1302; etc.). At step 1310, the point(s) obtained at step 1308 are used to extend the initial segmentation (or further extend the already extended initial segmentation), such as in the segmentation methods described herein above. For example, the pruning constraints of steps 1146-1152 can be relaxed for certain points that are identified during step 1308 to display a component that might otherwise be discarded. Similarly, the point(s) from step 1308 can be used to connect components at step 1160.

The segmentation extension methods as shown and described offer many benefits over existing image processing methodologies, and improve the operation of image processing software. The described method searches for and segments components (e.g., candidate sub-trees) that may be disconnected from the initial treelike structure in a region of interest, and connects the new segments to the previously segmented treelike structure based on geometric criteria and morphological properties of the candidate sub-tree. For example, the described method will detect potential sub-trees and infer a connection even if there is a mucus cap or motion artifact, which previous segmentation methods cannot do. Previous segmentation methods for finding airways in an image assume that no bronchi can be detected where no vessels are found. However, the disclosed method does not make this assumption, and therefore searches regions that may contain airway lumens that previous segmentation methods would fail to search. For example, finer vessels my fail to survive thresholding after down sampling or due to motion or imaging artifacts, and previous segmentation methods would fail to search these areas, for example to limit the time and memory necessary for the segmentation, and therefore fail to find airways that the current method would find. The disclosed method extends the segmentation in a region of interest, and therefore reduces the time and processing that may otherwise be required for segmentation, although the disclosed method can be applied iteratively to a coarse airway segmentation to give a more general segmentation method. As shown and described, the disclosed method region grows at detected seed points and then determines whether to discard components based on morphological and shape analysis criteria. These components are not necessarily connected to the initial segmentation, as in previous segmentation techniques that may involve pruning components already attached to region grow results. The disclosed method connects components that may or may not directly connect to the prior segmentation based on region growing alone. The method uses not only centerline orientation, but also distance and radius estimates, because the components may not connect directly to the prior segmentation. As distinct from previous techniques, the current method does no merging of masks, and only operates on a small sub-region of the image at a time, and therefore has much lesser memory requirements. The region grows are based on several seed points at once obtained through Hessian analysis of a bilaterally smoothed and contrast-enhanced sub-image, as opposed to grow regions based on one seed point alone (e.g., an estimated point in the trachea). Components are connected back to the initial segmentation that may not connect directly through region growing. The Hessian analysis utilized in the method imparts information about the orientation of the components, which information is usable in later steps of the method while also being used to discard seed points based on voxel radius estimates.

The segmentation extension methods described herein can be performed on image(s); image data; image dataset(s); at inspiration, expiration, or other respiratory or anatomical time period; on inspiration image data; on expiration image data; on fused inspiration-expiration image data; or any other suitable image or image data as may be useful for the particular application. For example, if a region of interest is identified during expiration, the extension method can be performed on the expiration image data, or alternatively can be performed on the associated inspiration image data (e.g., by deforming the region of interest back to the inspiration location, performing the extension method, and then deforming back to expiration for further use in navigation). The segmentation extension methods can be performed on image data before it is used for navigation, or on the image data during navigation. Although described herein with reference to airway structure and navigation in the airway structure, it is understood that the segmentation extension methods can be applied to other anatomical treelike structures within the scope of the present invention.

In tests conducted comparing the disclosed extension method to previous segmentation processes, the disclosed method found additional treelike structures not previously found. Based on 141 test cases where nodules were segmented and the disclosed method was applied to an initial airway segmentation result, the disclosed method: 1) found on average two additional airway lumens in a region of interest; 2) found at least one additional airway lumen in a region of interest 73% of the time; 3) improved the distance from the closest airway branch to the nodule 50% of the time; 4) on average, improved the distance from the airway to the nodule surface by 21% because the optimal path to the nodule can change based on new lumens being discovered; and 5) changed the optimal path to the nodule via the airway lumens 26% of the time.

It is noted that the terms "comprise" (and any form of comprise, such as "comprises" and "comprising"), "have" (and any form of have, such as "has" and "having"), "contain" (and any form of contain, such as "contains" and "containing"), and "include" (and any form of include, such as "includes" and "including") are open-ended linking verbs. Thus, a method, an apparatus, or a system that "comprises," "has," "contains," or "includes" one or more items possesses at least those one or more items, but is not limited to possessing only those one or more items. Individual elements or steps of the present methods, apparatuses, and systems are to be treated in the same manner.

The terms "a" and "an" are defined as one or more than one. The term "another" is defined as at least a second or more. The term "coupled" encompasses both direct and indirect connections, and is not limited to mechanical connections.

Those of skill in the art will appreciate that in the detailed description above, certain well known components and assembly techniques have been omitted so that the present methods, apparatuses, and systems are not obscured in unnecessary detail.

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents. Any feature of a disclosed embodiment can be combined with any other feature of any disclosed embodiment within the scope of the present invention.

The previous description of the embodiments is provided to enable any person skilled in the art to make or use the invention. While the invention has been particularly shown and described with reference to embodiments thereof, it will be understood by those skilled in art that various changes in form and details may be made therein without departing from the spirit and scope of the invention.

What is claimed is:

1. A method of extending a segmentation of an image using navigated image data from a navigation system, the method comprising:
    tracking, with the navigation system, at least one of a traveled path and a position of an imaging device relative to an initial segmentation of 3D image data including an initial treelike structure;
    capturing, with the imaging device, navigated image data comprising image data including at least one 2D or 3D image;
    obtaining, by the navigation system, a point from the navigated image data corresponding to a potential airway structure; and
    extending, by the navigation system, the initial segmentation of 3D image data using the point obtained from the navigated image data by:
        extracting a region of interest from the 3D image data to create a sub-image;
        extracting connected components based on spillage-constrained region growing using seed points from the sub-image;
        pruning the extracted components to discard components not likely to be connected to the initial treelike structure and keep only candidate components likely to be a valid sub-tree of the initial treelike structure; and
        connecting the candidate components to the initial treelike structure.

2. The method of claim 1, further comprising registering the navigated image data to the 3D image data.

3. The method of claim 1, further comprising constructing a 3D volume from the navigated image data.

4. The method of claim 3, wherein obtaining a point comprises automatically segmenting the constructed 3D volume to obtain a point from the navigated image data.

5. The method of claim 1, wherein obtaining a point comprises selecting the point using an I/O component of the navigation system.

6. The method of claim 1, wherein obtaining a point comprises obtaining a point cloud.

7. The method of claim 1, wherein extending the initial segmentation using the point obtained from the navigated image data comprises determining the region of interest in the 3D image data based on the point obtained from the navigated image data.

8. The method of claim 1, wherein extending the initial segmentation using the point obtained from the navigated image data further comprises performing the spillage-constrained region growing using the point obtained from the navigated image data as a seed point.

9. The method of claim 1, wherein pruning comprises:
    discarding components based on whether they have genus zero and are relatively convex, including determining whether a ratio of a volume of the extracted component before morphological closing to a volume of the extracted component after morphological closing is greater than a threshold;
    discarding or modifying components based on the components curving more than a threshold amount, including determining whether a dot product of a direction of the extracted component and a direction of a segment of the extracted component is below a threshold;
    discarding components based on a shape analysis of the shape of the extracted component, including comparing shape analysis metrics including at least one of a minor axis length, an elongation, and an eccentricity of the extracted component to target metrics; and
    discarding components based on a cylindrical score of the components, including determining a circle equivalent diameter of the extracted component.

10. The method of claim 9, wherein extending the initial segmentation using the point obtained from the navigated image data comprises relaxing the thresholds and analysis metrics in the pruning step based on the point obtained from the navigated image data.

11. The method of claim 1, wherein connecting comprises:
    determining whether the candidate component has boundary voxels that are 4-connected to the initial segmentation and if so filling in voxels to fully connect the candidate component to the initial segmentation;
    determining whether the radius of a candidate component is compatible with a terminal segment of the initial segmentation, and filling in voxels to connect the candidate component to the terminal segment if they are compatible;
    determining if the candidate component includes a path of seed points to the initial segmentation, and if so identifying potential new growth based on a gradient ball method.

12. The method of claim 11, wherein extending the initial segmentation using the point obtained from the navigated image data comprises relaxing the determinations in the connecting step based on the point obtained from the navigated image data.

13. The method of claim 1, wherein capturing comprises capturing 2D ultrasound image data with the imaging device.

14. A method of extending a segmentation of an image using navigation data from a navigation system, the method comprising:
- tracking, with the navigation system, at least one of a traveled path, a position, and a trajectory of a navigated instrument relative to an initial segmentation of 3D image data including an initial treelike structure to create navigation data; and
- extending the initial segmentation of the 3D image data using the navigation data, wherein extending the initial segmentation comprises:
  - extracting a region of interest from the 3D image data to create a sub-image;
  - extracting connected components based on spillage-constrained region growing using seed points from the sub-image;
  - pruning the extracted components to discard components not likely to be connected to the initial treelike structure and keep only candidate components likely to be a valid sub-tree of the initial treelike structure; and
  - connecting the candidate components to the initial treelike structure.

15. The method of claim 14, wherein extending the initial segmentation further comprises determining a region of interest based on the navigation data.

16. The method of claim 14, wherein extending the initial segmentation further comprises performing the spillage-constrained region growing using the navigation data of the navigated instrument as seed points.

17. The method of claim 14, wherein pruning comprises:
- discarding components based on whether they have genus zero and are relatively convex, including determining whether a ratio of a volume of the extracted component before morphological closing to a volume of the extracted component after morphological closing is greater than a threshold;
- discarding or modifying components based on the components curving more than a threshold amount, including determining whether a dot product of a direction of the extracted component and a direction of a segment of the extracted component is below a threshold;
- discarding components based on a shape analysis of the shape of the extracted component, including comparing shape analysis metrics including at least one of a minor axis length, an elongation, and an eccentricity of the extracted component to target metrics; and
- discarding components based on a cylindrical score of the components, including determining a circle equivalent diameter of the extracted component.

18. The method of claim 17, wherein extending the initial segmentation comprises relaxing the thresholds and analysis metrics in the pruning step based on the navigation data.

19. The method of claim 14, wherein connecting comprises:
- determining whether the candidate component has boundary voxels that are 4-connected to the initial segmentation and if so filling in voxels to fully connect the candidate component to the initial segmentation;
- determining whether the radius of a candidate component is compatible with a terminal segment of the initial segmentation, and filling in voxels to connect the candidate component to the terminal segment if they are compatible;
- determining if the candidate component includes a path of seed points to the initial segmentation, and if so identifying potential new growth based on a gradient ball method.

20. The method of claim 19, wherein extending the initial segmentation comprises relaxing the determinations in the connecting step based on the navigation data.

* * * * *